United States Patent
Rudrakar et al.

(10) Patent No.: US 12,555,126 B2
(45) Date of Patent: Feb. 17, 2026

(54) SYSTEM AND METHOD FOR DETECTING MARKET SENTIMENT MANIPULATION THAT IS RELATED TO FINANCIAL INSTRUMENTS TRADING

(71) Applicant: NICE LTD., Ra'anana (IL)

(72) Inventors: Nikhil Rudrakar, Maharashtra (IN); Lokesh Baranwal, Maharashtra (IN); Kunal Rajput, Maharashtra (IN)

(73) Assignee: NICE LTD., Ra'anana (IL)

( * ) Notice: Subject to any disclaimer, the term of this patent is extended or adjusted under 35 U.S.C. 154(b) by 37 days.

(21) Appl. No.: 18/731,290

(22) Filed: Jun. 2, 2024

(65) Prior Publication Data
US 2025/0371558 A1    Dec. 4, 2025

(51) Int. Cl.
*G06Q 30/018* (2023.01)
*G06Q 30/0203* (2023.01)

(52) U.S. Cl.
CPC ..... *G06Q 30/0185* (2013.01); *G06Q 30/0203* (2013.01)

(58) Field of Classification Search
None
See application file for complete search history.

(56) References Cited

U.S. PATENT DOCUMENTS

| | | | |
|---|---|---|---|
| 6,505,174 B1 * | 1/2003 | Keiser | G06Q 40/00 705/36 R |
| 11,238,535 B1 * | 2/2022 | Maeng | G06Q 40/04 |
| 11,710,181 B1 * | 7/2023 | Samman | G06Q 40/04 705/37 |
| 2013/0138577 A1 * | 5/2013 | Sisk | G06Q 40/04 705/36 R |

(Continued)

FOREIGN PATENT DOCUMENTS

CN    114998010 A  *  9/2022  ............... G06N 3/08

OTHER PUBLICATIONS

Piccione, Michele, and Ran Spiegler. "Manipulating market sentiment." Economics Letters 122.2 (2014): 370-373 (Year: 2014).*

(Continued)

*Primary Examiner* — Darlene Garcia-Guerra
(74) *Attorney, Agent, or Firm* — SOROKER AGMON NORDMAN RIBA; Liat Lin

(57) ABSTRACT

A computerized-method for detecting market sentiment manipulation that is related to financial-instruments trading. The computerized-method includes: (i) monitoring incoming alerts in an analytics-engine. (ii) retrieving data from each alert, by operating a context-extraction module; (iii) for each alert: a. collecting feeds from social-media servers based on the retrieved data by operating a social-media feeds-extraction module; b. for each feed, generating a summary by using Gen AI; and c. analyzing a social-media sentiment by providing the generated summary of each feed to the Gen-AI; (iv) for each financial instrument that has been traded in the preconfigured period, searching an anomaly between a sentiment from traditional news source and the analyzed social-media sentiment; (v) storing each anomaly in an anomalies database; and (vi) pausing each financial-transaction that has been processed and related to the financial-instrument in the anomalies database.

9 Claims, 19 Drawing Sheets

(56) References Cited

U.S. PATENT DOCUMENTS

| | | | | |
|---|---|---|---|---|
| 2017/0301015 | A1* | 10/2017 | Tunnell | G06Q 40/04 |
| 2020/0265270 | A1* | 8/2020 | Boudreau | G06N 20/00 |
| 2021/0065294 | A1* | 3/2021 | Trevathan | G06Q 40/08 |
| 2021/0103626 | A1* | 4/2021 | Jolly | G06Q 30/0241 |
| 2024/0256592 | A1* | 8/2024 | O'Neill | G06F 16/483 |
| 2025/0166074 | A1* | 5/2025 | Chan | G06Q 30/0201 |
| 2025/0225428 | A1* | 7/2025 | Meltsner | G06N 20/00 |

OTHER PUBLICATIONS

CN-114998010-GUO, Hao-ran, Stock Transaction Decision Method Based on Depth Reinforcement Learning and Market Sentiment (Machine Translation) (Year: 2022).*

Zhai, Jia, Yi Cao, and Xuemei Ding. "Data analytic approach for manipulation detection in stock market." Review of Quantitative Finance and Accounting 50.3 (2018): 897-932 (Year: 2018).*

* cited by examiner

SYSTEM AND METHOD FOR DETECTING MARKET SENTIMENT MANIPULATION THAT IS RELATED TO FINANCIAL INSTRUMENTS TRADING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of Generative artificial Intelligence (Gen AI), and more specifically to system and method for detecting market sentiment manipulation that is related to financial instruments trading by Gen AI.

BACKGROUND

Social Media platforms impact trading behaviors and introduce risk to financial institutions operating in public stock markets and exchanges. It has been a key point of concern for government and regulatory bodies. The social media platforms and contents are considered extremely unstructured, un-indexed, and include un-normalized data that is complicated to use for analysis or specific consideration when looking at trading behavior and anomalies related to compliance surveillance risk.

Generative Artificial Intelligence (Gen AI) can be used to provide aid in setting thresholds based on market sentiment in the social media platforms to reduce false-positive alerts.

There is a need for a technical solution that will implement Gen AI to summarize social media feeds to ensure timely and precise checks on influencers seeking to manipulate the market.

Furthermore, there is a need for a technical solution to distinguish authentic market events from intentional manipulations for personal gain, thus by the social media data inclusion, enhancing market transparency for regulators and investors.

There is a need for a system and method to identify market abuse and trade surveillance by using Gen AI social media content and to unveil hidden risks.

SUMMARY

There is thus provided, in accordance with some embodiments of the present disclosure, a computerized-method for detecting market sentiment manipulation that is related to financial instruments trading.

In accordance with some embodiments of the present disclosure, the computerized-method may include: (i) monitoring incoming alerts in an analytics engine, during a preconfigured period. The incoming alerts relate to suspicious financial-activity. (ii) retrieving data from each alert in the incoming alerts, by operating a context extraction module. The data comprising: a. instrument-identifier; and b. information of one or more thresholds of the alert; (iii) for each alert in the incoming alerts: a. collecting feeds from social-media servers based on the retrieved data by operating a social-media feeds-extraction module; and b. for each feed in the collected feeds, generating a summary by using Generative Artificial Intelligence (Gen AI); and c. analyzing a social-media sentiment by providing the generated summary of each feed to the Gen AI, to be stored in a social-media database with related data of the alert; (iv) for each financial instrument that has been traded in the preconfigured period, searching an anomaly between sentiment from traditional news source and the analyzed social-media sentiment. The anomaly indicates a detected market sentiment manipulation that is related to financial instruments trading; (v) storing each anomaly with the instrument-identifier in an anomalies database; and (vi) pausing each financial transaction that has been processed during the preconfigured period and related to the instrument-identifier in the anomalies database.

Furthermore, in accordance with some embodiments of the present disclosure, the operating of the context extraction module may include for each alert: (i) extracting the instrument-identifier by parsing the alert. The instrument-identifier is at least one of: a. stock-symbol; and b. International Securities Identification Number (ISIN), and (ii) fetching information of the one or more thresholds of the alert of the one or more thresholds from the analytics engine that generated the alert by exposing Application Programming Interfaces (API) s of the analytics engine.

Furthermore, in accordance with some embodiments of the present disclosure, the operating of the social-media feeds-extraction module may include: (i) using exposed APIs of the social-media servers to collect feeds based on the instrument-identifier; (ii) removing media objects and media elements from the feeds; and (iii) converting each collected feed into structured data.

Furthermore, in accordance with some embodiments of the present disclosure, the computerized-method may further include: (i) checking each financial instrument that has been traded in the preconfigured period to identify one or more financial instruments that do not have incoming alerts in the analytics engine; (ii) for each financial instrument in the identified one or more financial instruments that do not have incoming alerts in the analytics engine: a. collecting feeds from social-media servers by operating the social-media feeds-extraction module; b. for each feed in the collected feeds, generating a summary and analyzing social-media sentiment by operating a Gen AI on the social-media post to be stored in a social-media database with related instrument-identifier; c. retrieving a traditional-sentiment related to the financial instrument which has been extracted from traditional news sources; and d. creating a new-alert when the analyzed social-media sentiment and the traditional-sentiment of the financial instrument do not match.

Furthermore, in accordance with some embodiments of the present disclosure, when the analyzed social-media sentiment and the traditional-sentiment of the financial instrument do not match, the computerized-method may further include updating the one or more thresholds of the alerts generated by the analytics engine.

Furthermore, in accordance with some embodiments of the present disclosure, the computerized-method may further include showing each financial transaction that has been paused with financial instrument and instrument-identifier details via a User Interface of the analytics engine for further analysis by a user.

Furthermore, in accordance with some embodiments of the present disclosure, the new-alert may be presented via a UI of the analytics engine for further analysis by a user.

Furthermore, in accordance with some embodiments of the present disclosure, the computerized-method may further include pausing each financial transaction that has been processed during the preconfigured period and related to the financial instrument, when the analyzed sentiment and the traditional-sentiment of the financial instrument do not match.

Furthermore, in accordance with some embodiments of the present disclosure, the sentiment from traditional news source is retrieved from a traditional news source database.

There is further provided, in accordance with some embodiments of the present invention, a computerized-system for detecting market sentiment manipulation that is related to financial instruments trading.

Furthermore, in accordance with some embodiments of the present disclosure, the computerized-system includes one or more processors. The one or more processors may be configured to: (i) monitor incoming alerts in an analytics engine, during a preconfigured period. The incoming alerts relate to suspicious financial-activity. (ii) retrieve data from each alert in the incoming alerts, by operating a context extraction module. The data may include: a. instrument-identifier; and b. information of one or more thresholds of the alert; (iii) for each alert in the incoming alerts: a. collect feeds from social-media servers based on the retrieved data by operating a social-media feeds-extraction module; b. for each feed in the collected feeds, generate a summary by using Generative Artificial Intelligence (Gen AI); and c. analyzing a social-media sentiment by providing the generated summary of each feed to the Gen AI, to be stored in a social-media database with related data of the alert; (iv) for each financial instrument that has been traded in the preconfigured period, searching an anomaly between sentiment from traditional news source and the analyzed social-media sentiment. The anomaly indicates a detected market sentiment manipulation that is related to financial instruments trading; (v) store each anomaly with the instrument-identifier in an anomalies database; and (vi) paus each financial transaction that has been processed during the preconfigured period and related to the instrument-identifier in the anomalies database.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1A:
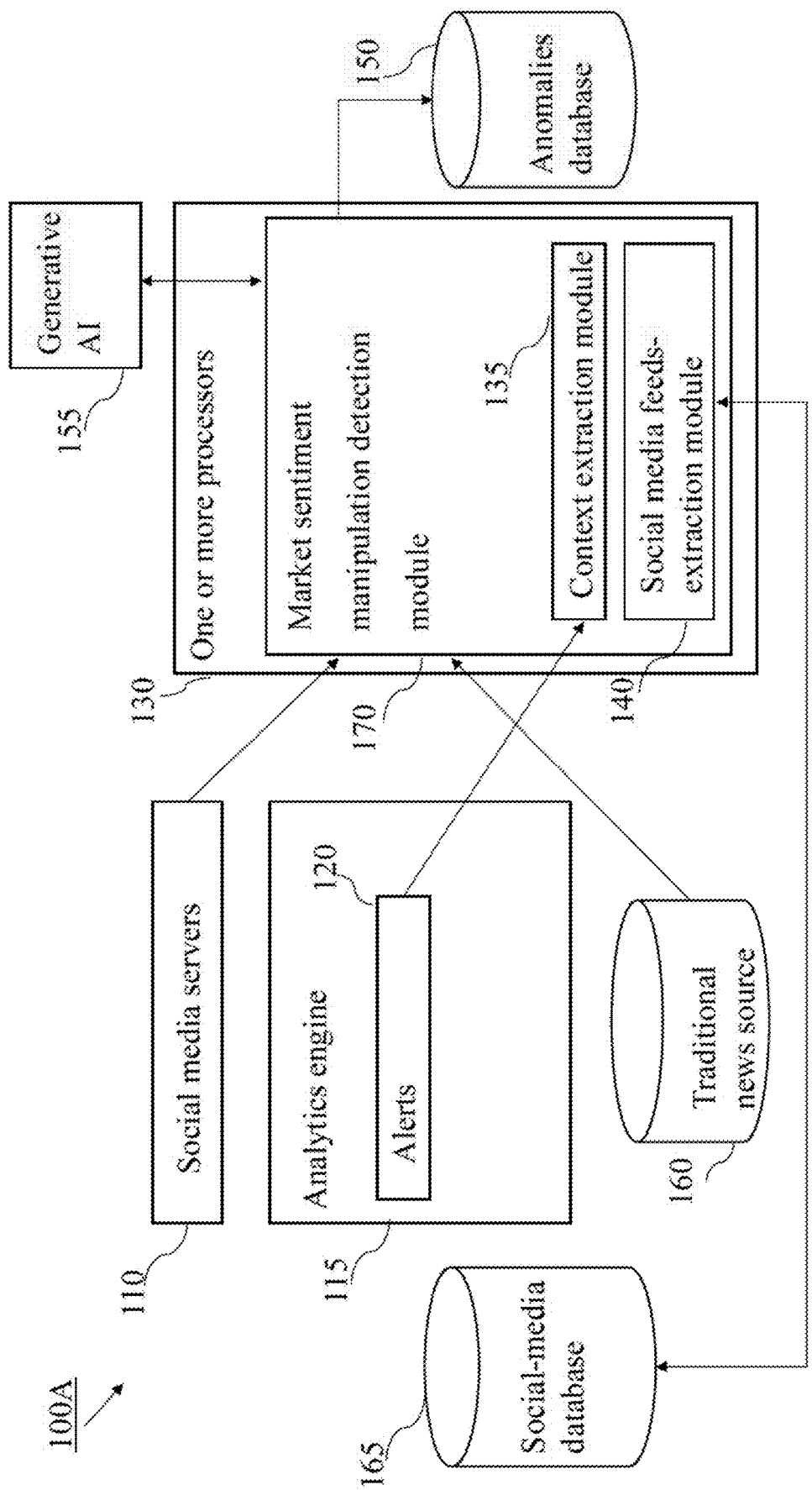
FIGS. 1A-1B schematically illustrate a high-level diagram of a computerized-system for detecting market sentiment manipulation that is related to financial instruments trading, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The GameStop and WallStreetBets saga of 2021 exemplifies how social media can profoundly influence market sentiment of financial instruments. This in turn triggered extreme stock price volatility and significant financial consequences. An influencer's tweets about a company on social media have been shown to influence market sentiment and drive fluctuations in the price of the cryptocurrency.

Social media platforms today, provide timely updates that outpace traditional news sources. Influencers discreetly buy specific stocks and influence their followers in the social media platforms to do the same, without revealing their intentions to sell later. Moreover, social media platforms impact trading behaviors and introduce risk to financial institutions operating in public stock markets and exchanges. It has been a key point of concern for government and regulatory bodies.

Traditional news outlets primarily offer structured and pre-packaged information. They may not provide access to unstructured data sources, such as earnings call transcripts, blogs, or social media posts, which can be essential for comprehensive transaction analysis.

Pump-and-dump is a form of securities fraud that involves inflating the price of a stock through false and misleading positive statements that may be analyzed to a positive sentiment with the intention of later on selling the stock at a higher price than the price it has been purchased. The fraudsters may use social-media platforms to spread false information about a stock. The false information may no exist in traditional news sources.

Increasingly sophisticated financial crimes and rising regulatory pressures are placing costly demands on Financial Services Organizations (FSO)s. To manage financial crime risk, analysts need to leverage disparate systems and ingest massive quantities of data-a cumbersome process that's unsustainable given an increasing transaction volumes.

Therefore, there is a need for an AI-enabled financial crime investigation management system that may provide a unified platform to manage fraud alerts and cases across a wide ecosystem of financial crime solutions.

There is a need for a technical solution that will enhance accuracy and address false positive alerts relate to suspicious financial-activity based on social media content instead of traditional news source only.

FIG. 1A schematically illustrates a high-level diagram of a computerized-system 100A for detecting market sentiment manipulation that is related to financial instruments trading, in accordance with some embodiments of the present invention.

Figure 2A:
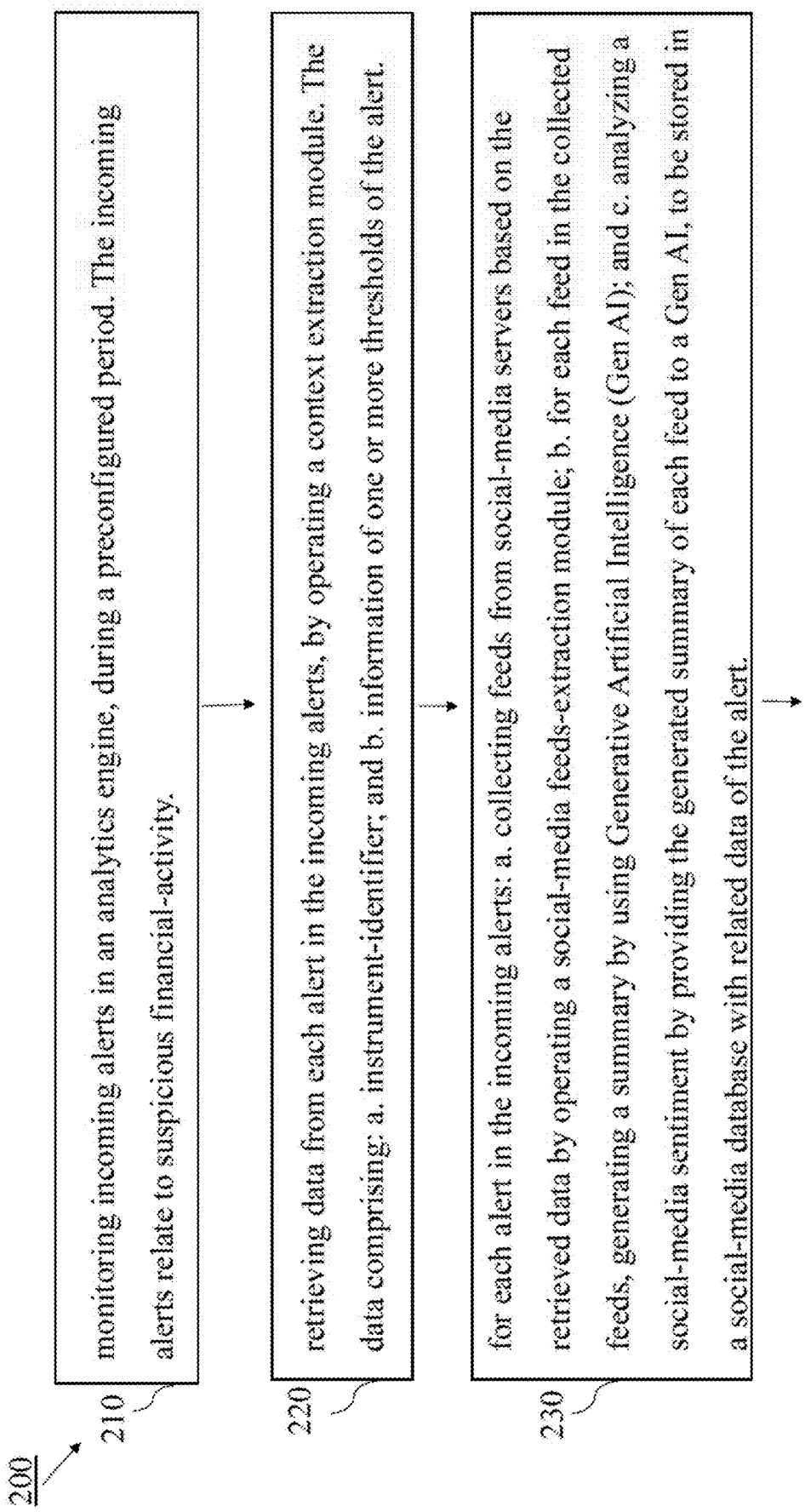
FIGS. 2A-2B schematically illustrates a high-level workflow of a computerized-method for detecting market sentiment manipulation that is related to financial instruments trading, in accordance with some embodiments of the present invention.
Figure 2B:
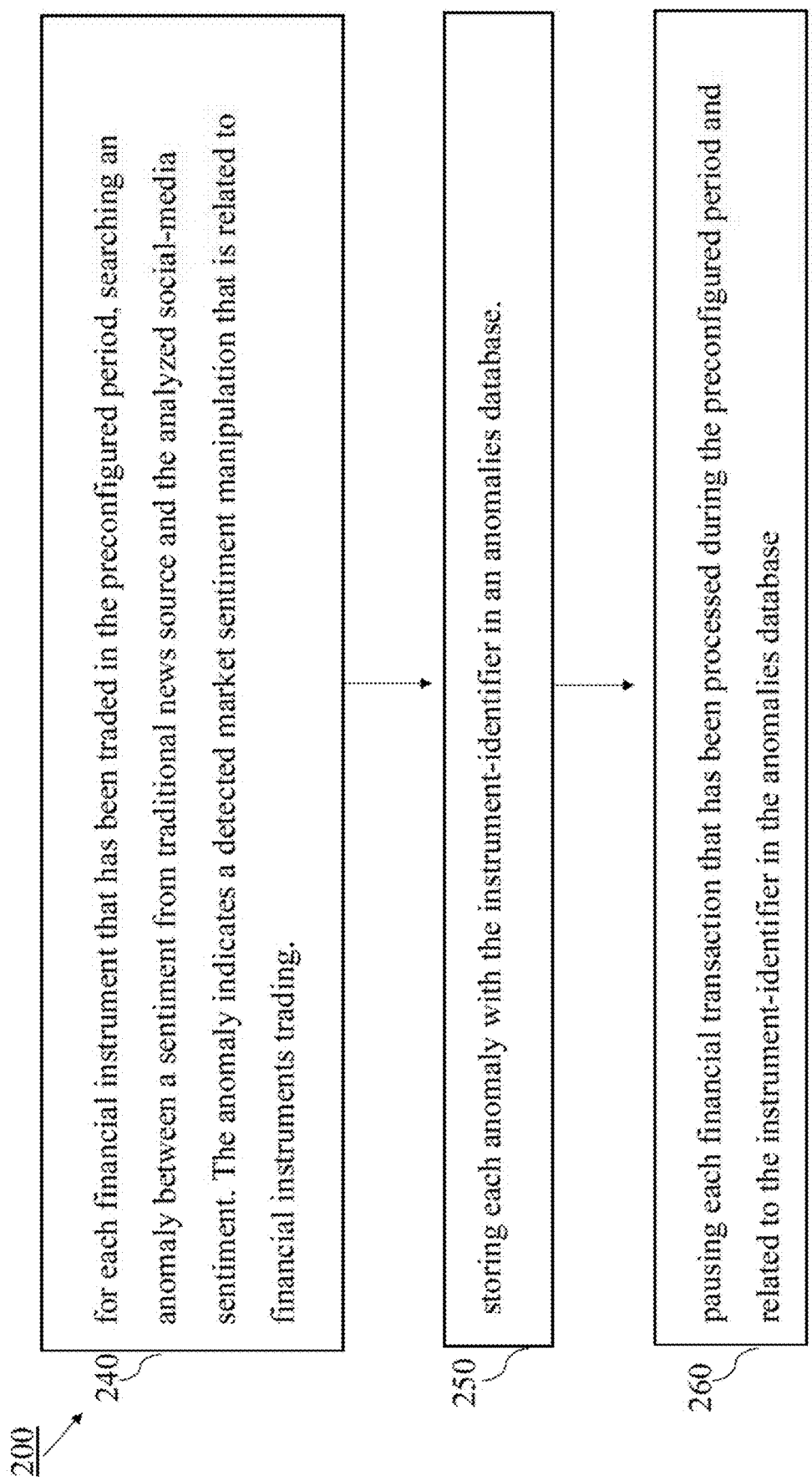

According to some embodiments of the present disclosure, a system, such as computerized-system 100A may establish a missing link between social media news and alerts and may provide into the impact of social media news on trade compliance solutions, by implementing the computerized-method 200 in FIG. 2A-2B for detecting market sentiment manipulation that is related to financial instruments trading.

According to some embodiments of the present disclosure, system 100A may operate market sentiment manipulation detection module to monitor incoming alerts 120 that relate to suspicious financial-activity, in an analytics engine 115, during a preconfigured period and to retrieve data from each alert by operating a module, such as context extraction module 135.

According to some embodiments of the present disclosure, the operating of the context extraction module 135 may include: for each alert: extracting the instrument-identifier by parsing the alert and fetching information of the one or more thresholds of the alert of the one or more thresholds from the analytics engine that generated the alert by exposing Application Programming Interfaces (API) s of the analytics engine. For example, the detection algorithm in the analytics engine 115 may generate an insider trading alert based on threshold percentage-price-change.

According to some embodiments of the present disclosure, the instrument-identifier may be stock-symbol, and International Securities Identification Number (ISIN). The ISIN is a unique identifier for securities. A stock symbol is a unique series of letters assigned to a security for trading purposes.

According to some embodiments of the present disclosure, for example, Java Architecture for XML Binding (JAXB) is an API and tool that automates mapping between Extensible Markup Language (XML) documents and Java objects to marshal, e.g., convert Java objects into XML data, unmarshall, e.g., reading XML data and creating Java objects and update XML content using Java code.

According to some embodiments of the present disclosure, the retrieved data of each alert may include instrument-identifier and information of threshold upon which the alert has been generated in the analytics engine 115.

According to some embodiments of the present disclosure, for each alert social-media posts may be retrieved from authenticated and trustworthy accounts. Feeds may be collected from social-media servers 110 based on the retrieved data of the alert by operating a module, such as social-media feeds-extraction module 140.

According to some embodiments of the present disclosure, a feed in a social-media platform refers to a stream of content displayed to a user on the platform. It may include updates, content from pages or accounts the user has chosen to follow. The feed may include text, images, videos, and other media elements, such that users are provided with a personalized experience.

According to some embodiments of the present disclosure, the operating of the social-media feeds-extraction module 140 may include: (i) using exposed APIs of the social-media servers to collect feeds based on the instrument-identifier; (ii) removing media objects and media elements from the feeds; and (iii) converting each collected feed into structured data.

According to some embodiments of the present disclosure, for each feed in the collected feeds a summary may be generated by using Generative Artificial Intelligence (Gen AI) 155. A feed may be for example a list of tweets fetched from Twitter API for instrument AMZN. Such as, "The duration of the upward movement is 280 calendar days. If we don't have a correction, we have a Collapse on the specified day, and if there is a correction in the market in the future, a new reversal time frame will be formed AMZN Daily.

AMZN As long we hold that pattern breakout and hold V 141.22 I'm bullish Above 143.09 Bounce 142.09

AMZN putting a puzzle together step by step

AMZN amazon broke the 141 level and buyers continue to step in. Look for 141 to act as support on a move down.

The 2023 high is the level to watch for resistance. (hashtag) trading, (hashtag) investing, (hashtag) stockmarket". Accordingly, the generated summary of the feed by using the Gen AI may be, "The Twitter feeds discuss the upward trend of Amazon's stock (AMZN), predicting a potential market correction or collapse, but remain bullish as long as the stock price stays above 141.22, with 2023 high as the resistance level."

According to some embodiments of the present disclosure, a social-sentiment of the financial-instrument that is in the alert may be analyzed by providing the generates summary of each feed of the collected feeds to the Gen AI 155. The result, e.g., social-media sentiment from the Gen AI 155 may be stored in a database, such as social-media database 165 with related data of the alert, e.g., instrument-identifier, and information of thresholds of the alert.

According to some embodiments of the present disclosure, system 100A may retrieve each financial instrument that has been traded in the preconfigured period. For each financial instrument an anomaly between a sentiment from traditional news source and the analyzed social-media sentiment may be searched. The anomaly indicates a detected market sentiment manipulation that is related to financial instruments trading. Each anomaly between a sentiment from traditional news source and the analyzed social-media sentiment, may be stored with the related instrument-identifier in a database, such as anomalies database 150.

According to some embodiments of the present disclosure, the sentiment from traditional news source may be retrieved from a database. such as traditional news source database 160. The sentiment from traditional news source may have been analyzed for a financial instrument that has been traded during a preconfigured period and stored in the traditional news source database 160.

According to some embodiments of the present disclosure, each financial transaction that has been processed during the preconfigured period and related to the instrument-identifier in the anomalies database may be paused. Thus, leveraging Gen AI capabilities for assessing market sentiment in social-media posts, e.g., feeds and verifying any disparities with conventional sentiment analysis, e.g., traditional news source sentiment analysis.

According to some embodiments of the present disclosure, each financial transaction that has been paused may be displayed with financial instrument and instrument-identifier details via a User Interface (UI) of the analytics engine 115 for further analysis by a user. For example, as shown in UI 1200 in FIG. 12.

According to some embodiments of the present disclosure, the Gen AI may be applied to suggest or automatically update adaptable thresholds instead of the thresholds that were in the incoming alert 120 according to market sentiment. For example, if market sentiment shows a drastic change from positive to negative, then system 100A may present a suggestion to lower the value of the thresholds to catch all possible pump and dump alerts in the analytics engine 115.

when the system does not create any alert for the instrument, and we see a lot of movement in social media feeds and sentiment. It suggests that the thresholds applied for the detection model need to be updated.

According to some embodiments of the present disclosure, for example, when the suspicious activity detection algorithm in the analytics engine 115 generates an insider trading alert based on the threshold percentage-price-change then, when it is configured to be 5% and there is social-media feeds for the instrument with sentiment that indicates an anomaly compared to traditional source news and no alert when the percentage-price-change is 4.95%, then the system may automatically update the threshold to 4.95%.

According to some embodiments of the present disclosure, the Gen AI may be employed to cross-reference the number of received alerts with the expected count determined by market sentiment. The cross reference may be based only on the existence or non-existence of an alert generated by the system. When the system does not create any alert for the instrument but there is movement in social-media feeds which are related to the instrument and the generated sentiment by the Gen AI suggests an anomaly or disparity in the system.

According to some embodiments of the present disclosure, the Gen AI 155 may be for example, open AI models, open AI libraries or any other AI tool.

According to some embodiments of the present disclosure, system 100A may check absence of alert of suspicious activity based on social-media feeds. Each financial instrument that has been traded in the preconfigured period may be checked to identify financial instruments that do not have incoming alerts in the analytics engine. For each financial instrument in the identified financial instruments that do not have incoming alerts in the analytics engine 115 collecting feeds from the social-media servers 110 by operating the social-media feeds-extraction module 140. For each feed in the collected feeds, generating a summary by using Gen AI 155 and analyzing the social-media sentiment by operating the Gen AI 155 on the social-media post to be stored in a social-media database 165 with related instrument-identifier.

According to some embodiments of the present disclosure, a traditional-sentiment related to the financial instrument which has been extracted from traditional news sources may be retrieved and a new-alert may be created when the analyzed social-media sentiment and the traditional-sentiment of the financial instrument do not match. The new-alert may be presented via a UI of the analytics engine for further analysis by a user.

According to some embodiments of the present disclosure, optionally, in the absence of alert of suspicious activity for a financial instrument, when the analyzed sentiment and the traditional-sentiment of the financial instrument do not match the analyzed social-media sentiment, pausing each financial transaction that has been processed during the preconfigured period and related to the financial instrument.

According to some embodiments of the present disclosure, when the analyzed social-media sentiment and the traditional-sentiment of the financial instrument that didn't have incoming alerts do not match, then the thresholds of the alerts generated by the analytics engine may be updated. For example, if sentiment that has been analyzed from traditional news source do not match with sentiment that has been analyzed from social-media, e.g., by system 100A, the ambiguity may be raised by changing the alert step to auto-escalate and creating a case against it.

Figure 1B:
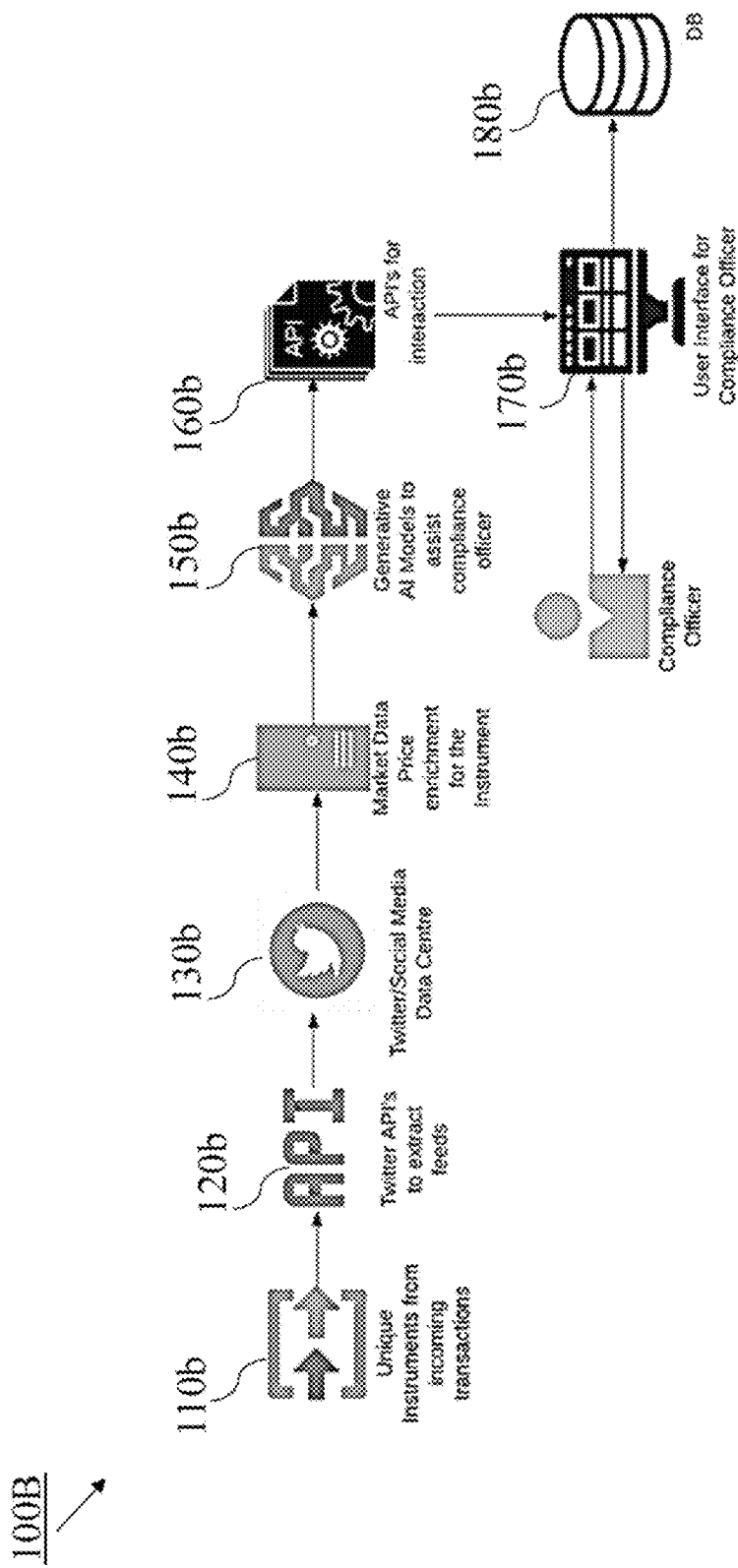

FIG. 1B schematically illustrates a high-level diagram of a computerized-system 100B for detecting market sentiment manipulation that is related to financial instruments trading, in accordance with some embodiments of the present invention.

According to some embodiments of the present disclosure, system 100B may include similar components as system 100A in FIG. 1A.

According to some embodiments of the present disclosure, unique instruments, e.g., financial instruments may be gathered from incoming transactions 110b or trades. Then, APIs exposed by social media platforms may be consumed to fetch the feeds based on keywords, location, and other metrics. The APIs may be for example, Twitter® APIs to extract feeds 120*b*.

According to some embodiments of the present disclosure, once the social-media feeds may be received from the APIs 130*b*, e.g., Twitter and social-media datacenter, the associated market data may be linked. the market data price enrichment for the instrument 140*b*. The enriched data may be fed to the Gen AI 150*b*, such as Gen AI 155 in FIG. 1A, which will generate content that via APIs for interaction 160*b* may be displayed for compliance officers by a User Interface 170*b*. The compliance officer may consume the displayed content for investigation. For example, as shown in UI 1200 in FIG. 12.

According to some embodiments of the present disclosure, system 100B and system 100A in FIG. 1A may summarize social media feeds by using Gen AI, such as Open AI models. The summaries may be used to ensure that there are timely checks on influencers seeking to manipulate the market via social-media posts or feeds, thus improve the operation of the trade surveillance, e.g., analytics engine 115 in FIG. 1A operation.

According to some embodiments of the present disclosure, system 100B and system 100A in FIG. 1A may provide the ability to distinguish authentic market events from intentional manipulations for personal gain. Moreover, the inclusion of social-media feeds may enhance market transparency for regulators and investors.

FIGS. 2A-2B schematically illustrates a high-level workflow of a computerized-method for detecting market sentiment manipulation that is related to financial instruments trading, in accordance with some embodiments of the present invention.

According to some embodiments of the present disclosure, operation 210 comprising monitoring incoming alerts in an analytics engine, during a preconfigured period. The incoming alerts relate to suspicious financial-activity.

According to some embodiments of the present disclosure, operation 220 comprising retrieving data from each alert in the incoming alerts, by operating a context extraction module. The data comprising: a. instrument-identifier; and b. information of one or more thresholds of the alert.

According to some embodiments of the present disclosure, operation 230 comprising for each alert in the incoming alerts: a. collecting feeds from social-media servers based on the retrieved data by operating a social-media feeds-extraction module; b. for each feed in the collected feeds, generating a summary by using Generative Artificial Intelligence (Gen AI); and c. analyzing a social-media sentiment by providing the generated summary of each feed to the Gen AI, to be stored in a social-media database with related data of the alert.

According to some embodiments of the present disclosure, operation 240 comprising for each financial instrument that has been traded in the preconfigured period, searching an anomaly between a sentiment from traditional news source and the analyzed social-media sentiment. The anomaly indicates a detected market sentiment manipulation that is related to financial instruments trading.

According to some embodiments of the present disclosure, operation 250 comprising storing each anomaly with the instrument-identifier in an anomalies database.

According to some embodiments of the present disclosure, operation 260 comprising pausing each financial transaction that has been processed during the preconfigured period and related to the instrument-identifier in the anomalies database.

Figure 3:
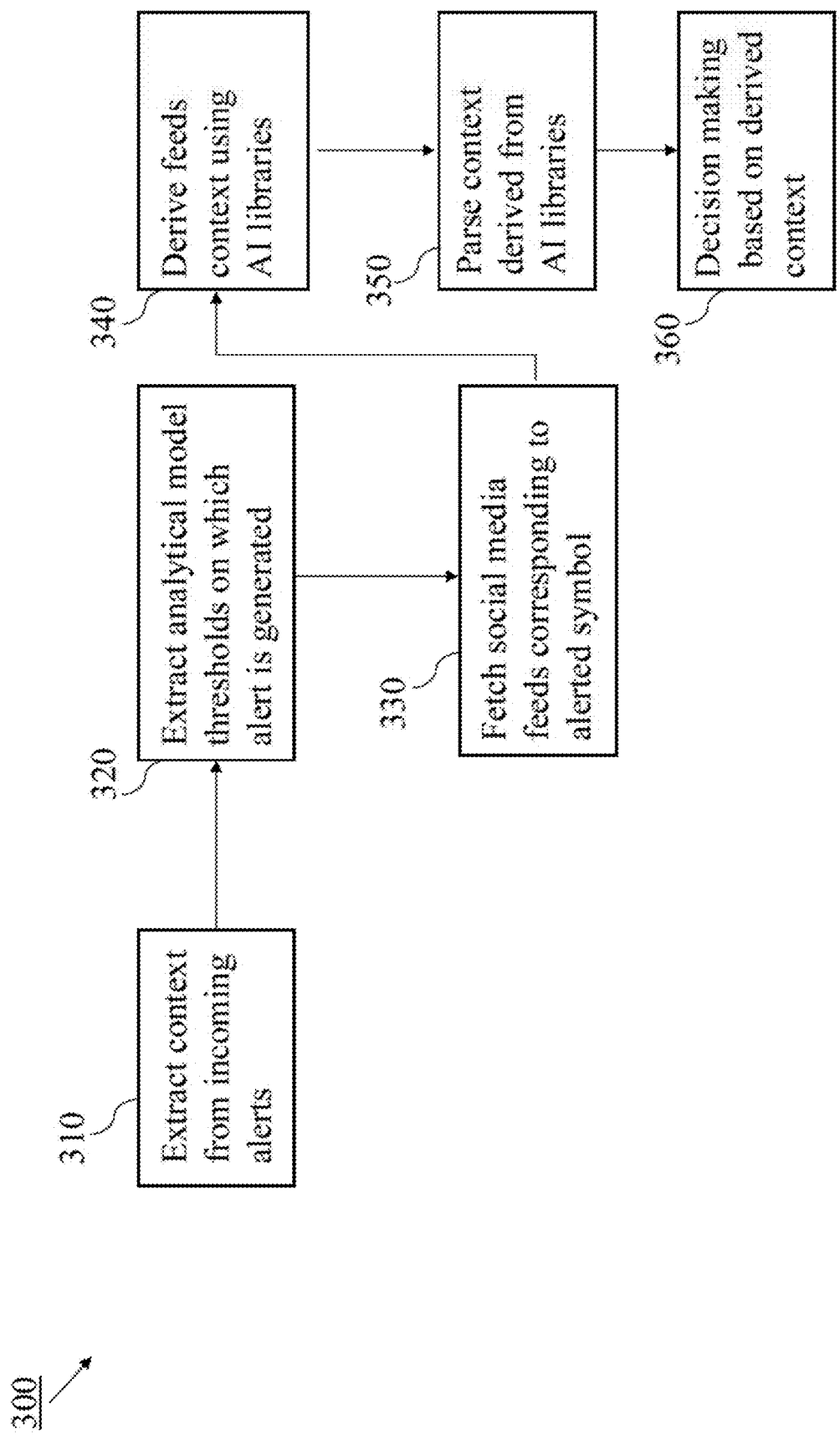
FIG. 3 schematically illustrates a high-level workflow of a computerized-method for detecting market sentiment manipulation that is related to financial instruments trading, in a contact center, in accordance with some embodiments of the present invention.

FIG. 3 schematically illustrates a high-level workflow 300 of a computerized-method for detecting market sentiment manipulation that is related to financial instruments trading, in a contact center, in accordance with some embodiments of the present invention.

According to some embodiments of the present disclosure, in system 100A in FIG. 1A and system 100B in FIG. 1B, alerts, such as alerts 120 in FIG. 1A which have been generated from the analytics engine 115 in FIG. 1A, may be input data by extracting context from incoming alerts 310. Contextual information may be extracted from the alert, such as instrument-identifier. Then, information of thresholds of the alert may be fetched from the analytics engine that generated the alert by exposing APIs of the analytics engine, by extracting analytical model thresholds on which alert is generated 320.

According to some embodiments of the present disclosure, the social Media feeds may be extracted using APIs provided by social media platforms, such as Twitter and X, by deriving feeds context using AI libraries 340. These feeds may be used as input for AI models to extract the results and make decisions. Parse context derived from AI libraries 350 and decision making based on derived context 360 may be operated. For example, as shown in FIG. 4.

Figure 4:
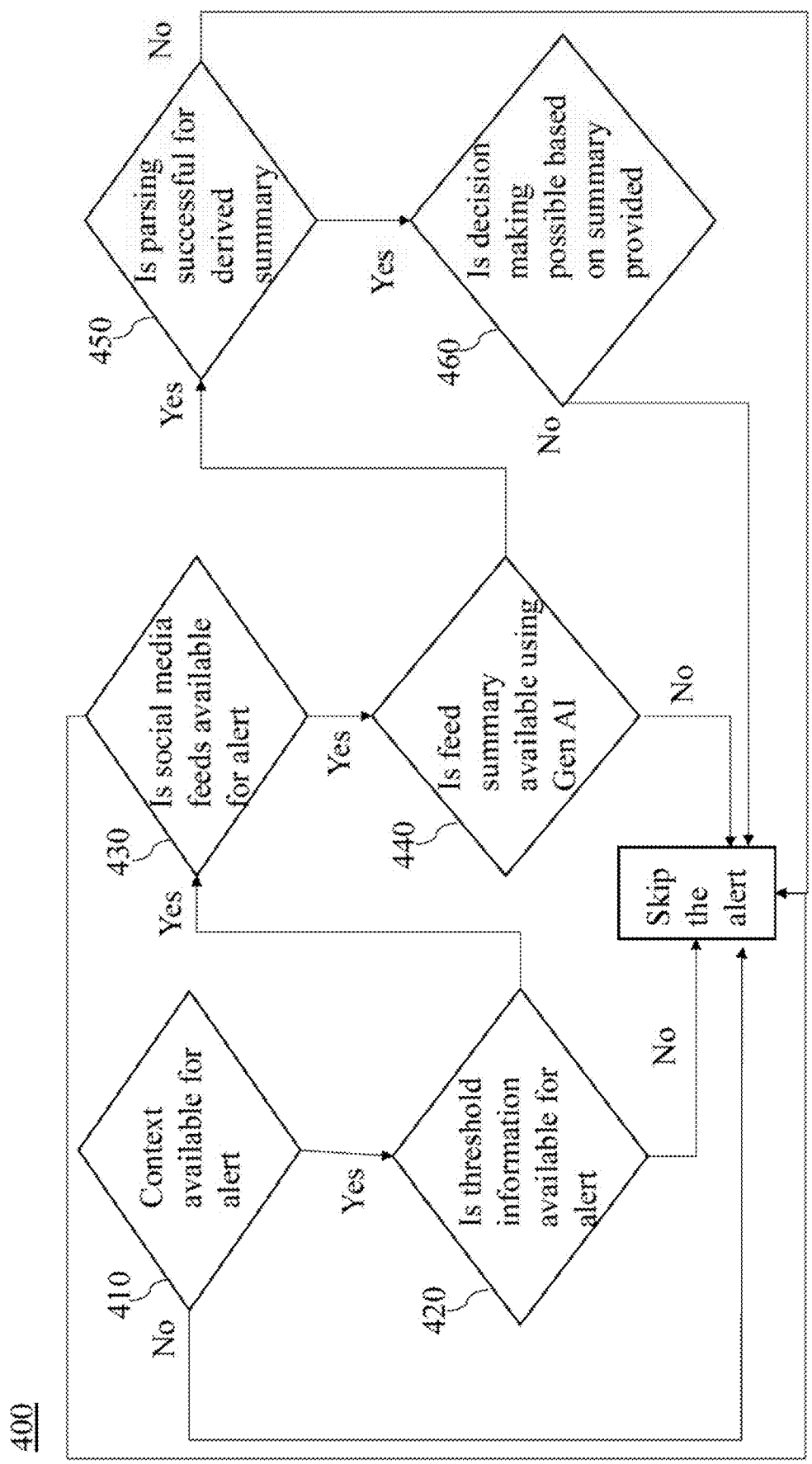
FIG. 4 schematically illustrates a high-level workflow of a high-level decision diagram, in accordance with some embodiments of the present invention.

FIG. 4 schematically illustrates a high-level workflow 400 of a high-level decision diagram, in accordance with some embodiments of the present invention.

According to some embodiments of the present disclosure, for each incoming alert in system 100A in FIGS. 1A and 1*n* system 100B in FIG. 1B, the following decisions may be operated.

According to some embodiments of the present disclosure, context available for alert 410. If the context is available for the alert, then checking if threshold information is available for the alert 420. If threshold information is available in the analytics engine, such as analytics engine 115 in FIG. 1A, for the alert, then checking if social-media feeds are available for the alert 430.

According to some embodiments of the present disclosure, when social-media feeds are available for the alert in the social-media servers, such as social-media servers 110 in FIG. 1A, then checking if there is feed summary available by using Gen AI 440, such as Gen AI 155 in FIG. 1A.

According to some embodiments of the present disclosure, when there is feed summary available using Gen AI 440 then checking if parsing is successful for the derived summary 450. When the parsing is successful for the derived summary, checking if decision making is possible based on the summary provided 460. Meaning, if the summary provide by GenAI doesn't provide quantifiable response, then decision making is not possible. For Example, a response from GenAI may be "Sentiment of these tweets are unknown, cannot provide the ratings."

Figure 5A:
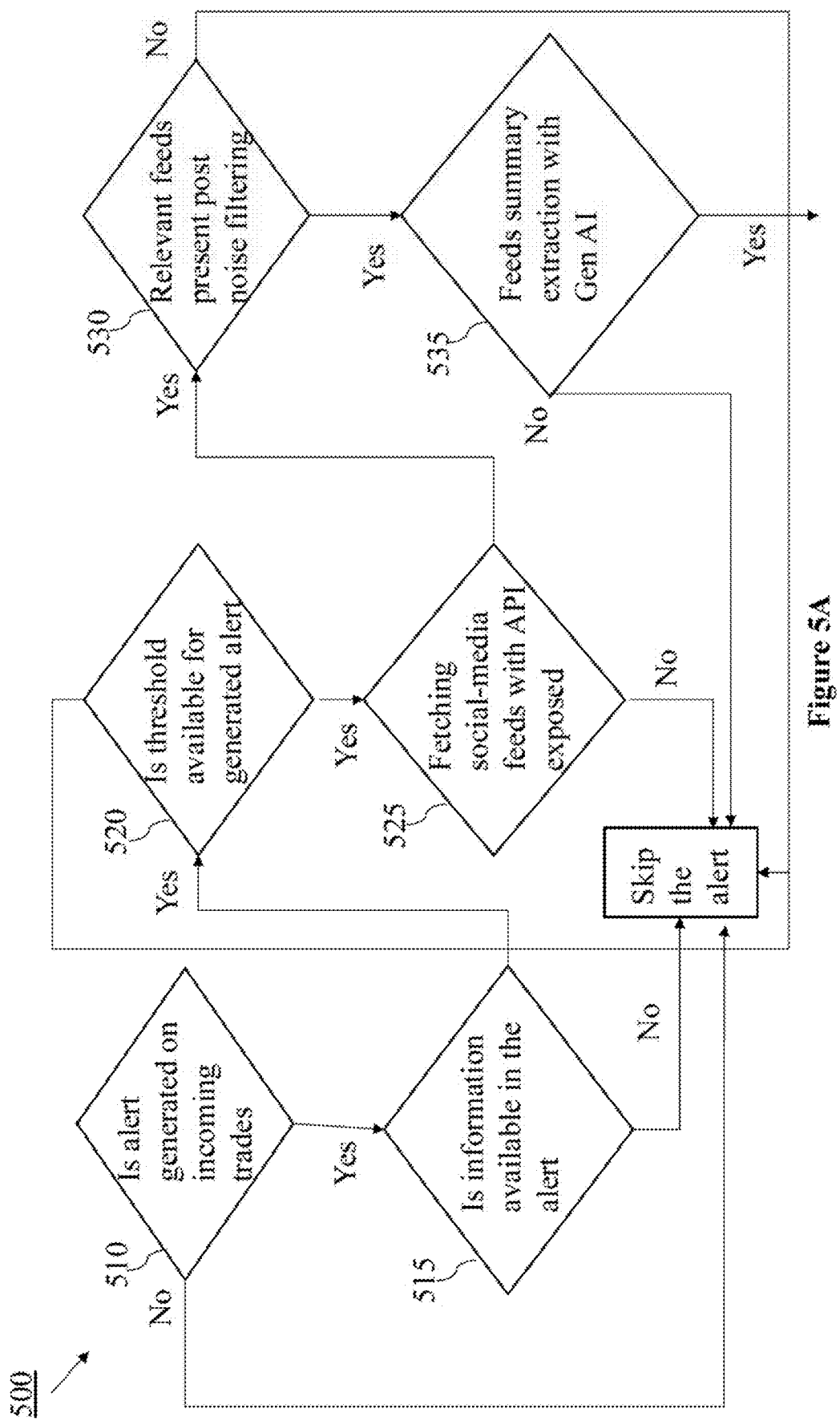
FIGS. 5A-5B schematically illustrate a high-level workflow of a decision diagram, in accordance with some embodiments of the present invention.
Figure 5B:
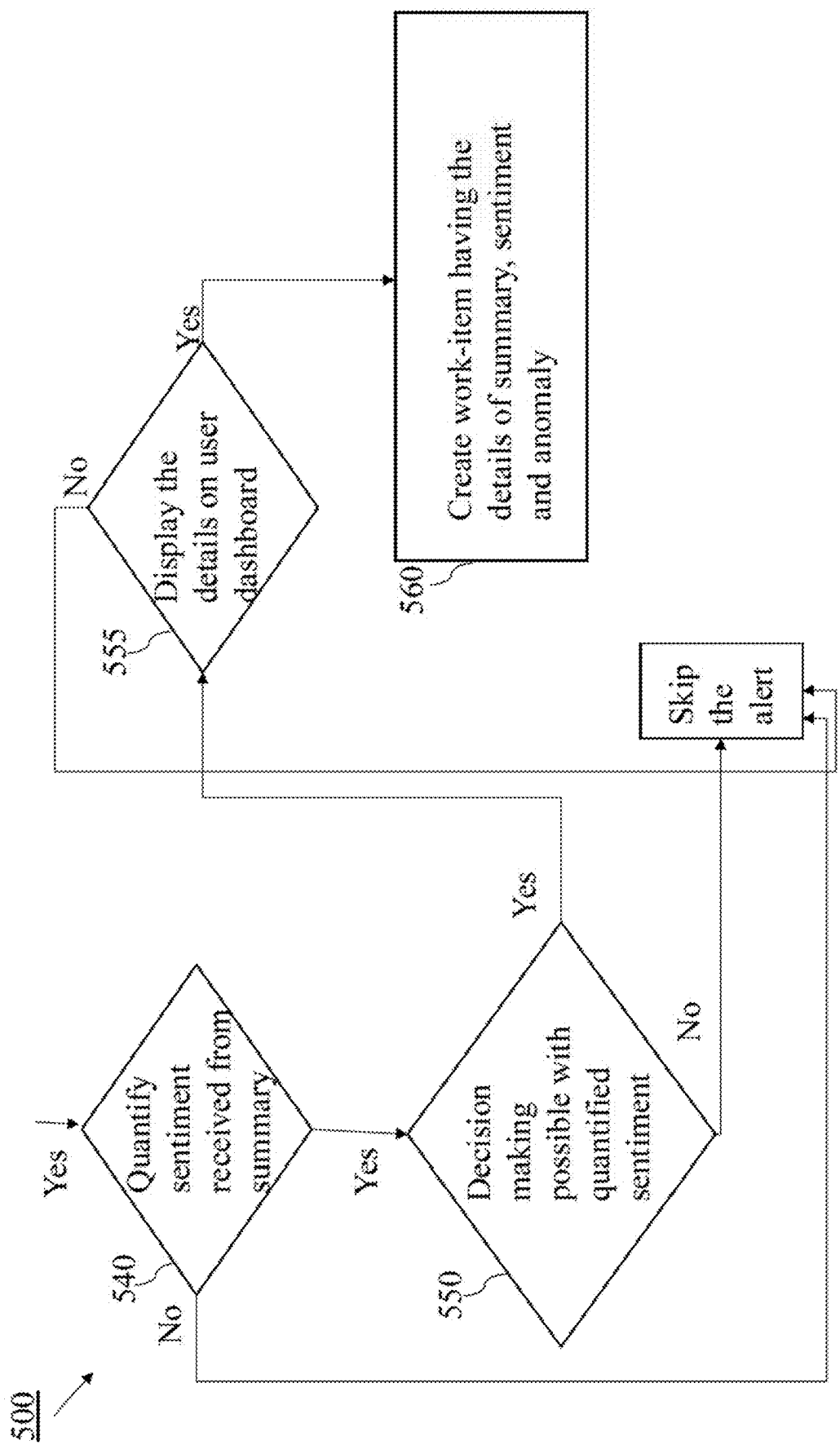

FIGS. 5A-5B schematically illustrate a high-level workflow 500 of a decision diagram, in accordance with some embodiments of the present invention.

According to some embodiments of the present disclosure, in system 100A in FIG. 1A and system 100B in FIG. 1B the following decisions may be made.

According to some embodiments of the present disclosure, checking if there is an alert that has been generated on incoming trades 510. When there is an alert, checking if there is information available in the alert 515. The information may be instrument-identifier by parsing the alert. The instrument-identifier may be stock-symbol and International Securities Identification Number (ISIN).

According to some embodiments of the present disclosure, when there is available information, then based on the instrument-identifier checking is there is threshold available for the alert 520 in the analytics engine, such as analytics engine 115 in FIG. 1A.

According to some embodiments of the present disclosure, when there is threshold available for the alert, fetching social-media feeds with API exposed 525. If there are social-media feeds then, relevant feeds present post noise filtering 530. Social media tweets may have lot of unnecessary data like images, audio or video file which may be excluded before the sentiment extraction.

According to some embodiments of the present disclosure, operating feeds summary extraction with Gen AI, such as Gen AI 155 in FIG. 1A. If there is summary extraction, then quantifying sentiment received from the summary 540. The sentiment may by analyzed by providing the summary to Gen AI.

According to some embodiments of the present disclosure, checking if decision making is possible with the quantified sentiment 550, when it is possible then displaying the details on user dashboard 555 and creating a work-item having the details of the summary, sentiment, and anomaly 560.

According to some embodiments of the present disclosure, the anomaly may be between a sentiment from traditional news source and the analyzed social-media sentiment and may indicate a detected market sentiment manipulation that is related to financial instrument trading. For example, as shown in UI 1200 in FIG. 12

According to some embodiments of the present disclosure, the anomaly may be stored with the instrument-identifier in an anomalies database, such as anomalies database 150 in FIG. 1A.

Figure 6:
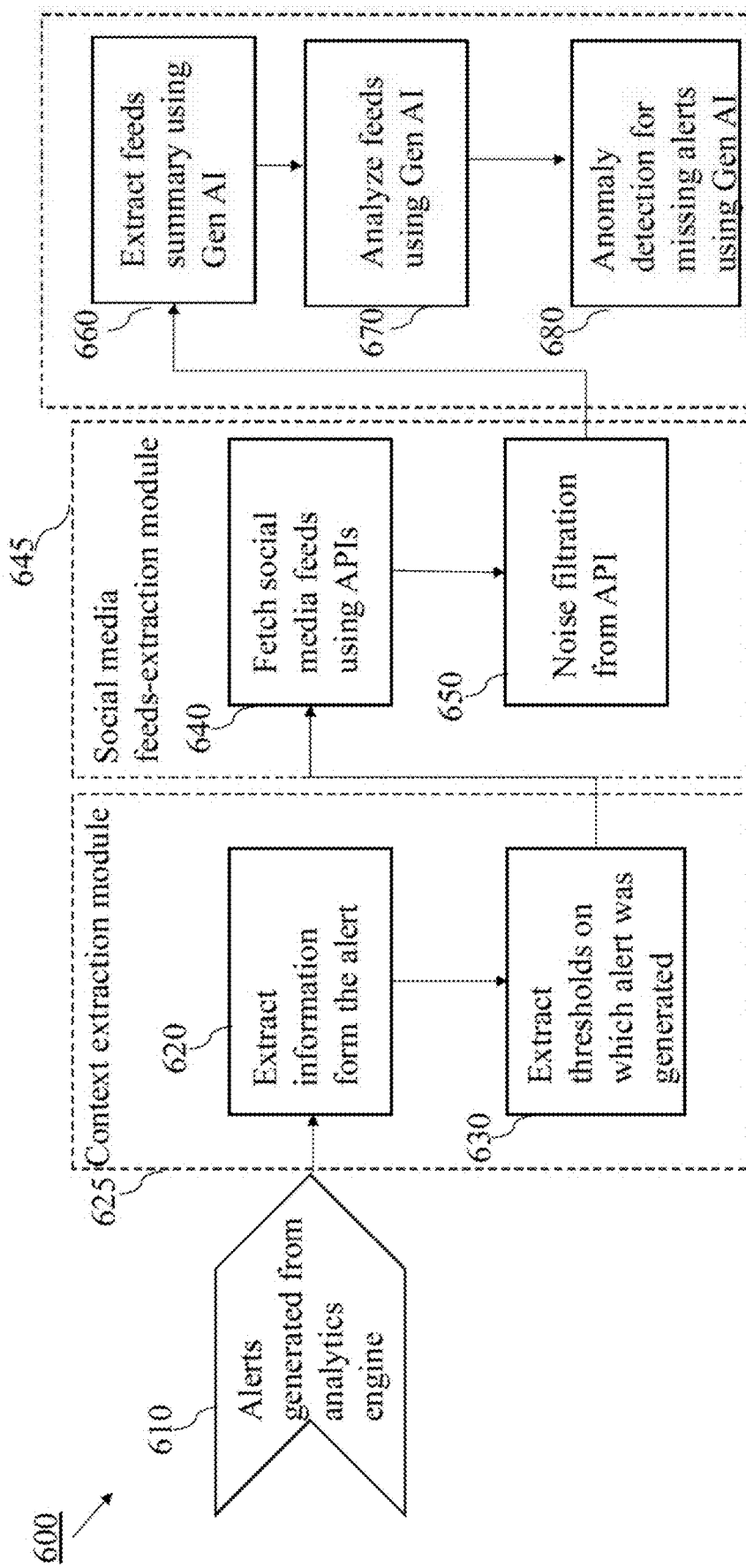
FIG. 6 schematically illustrates a high-level workflow of a computerized-method for detecting market sentiment manipulation that is related to financial instruments trading, in accordance with some embodiments of the present invention.

FIG. 6 schematically illustrates a high-level workflow 600 of a computerized-method for detecting market sentiment manipulation that is related to financial instruments trading, in accordance with some embodiments of the present invention.

According to some embodiments of the present disclosure, system 100A in FIG. 1A may include market sentiment manipulation detection by operating context extraction module 625 and social-media feeds-extraction module 645.

According to some embodiments of the present disclosure, the context extraction module 625 may handle gathering data of the financial-instrument, such as instrument-identifier, from incoming alerts generated from analytics engine 610 by extract information from the alert 620 and extract threshold on which the alert was generated 630 from the analytics engine.

According to some embodiments of the present disclosure, the social-media feeds-extraction module 645 may handle collection of feeds from social-media servers, such as social-media servers 110 in FIG. 1A, by using input from the context extraction module 625, e.g., instrument-identifier and threshold.

According to some embodiments of the present disclosure, social-media feeds-extraction module 645 may fetch social-media feeds using AIPs 640 and may operate noise filtration from API 650 to remove data that is not useful. Since social media tweets may have a lot of unnecessary data like images, audio or video file which have to be excluded before the operation of the sentiment extraction. The APIs exposed by social-media platforms may be used to collect the information.

According to some embodiments of the present disclosure, after unnecessary data is removed from the social-media feeds, providing the feeds to Gen AI to extract feeds summary 660 and then analyzing the feeds-summary by using Gen AI 670, such as Gen AI 155 in FIG. 1A to yield social-media sentiment.

According to some embodiments of the present disclosure, operating anomaly detection for missing alerts by using Gen AI 680 by retrieving a traditional-sentiment related to the financial instrument which has been extracted from traditional news sources and creating a new-alert when the analyzed social-media sentiment and the traditional-sentiment of the financial instrument do not match.

Figure 12:
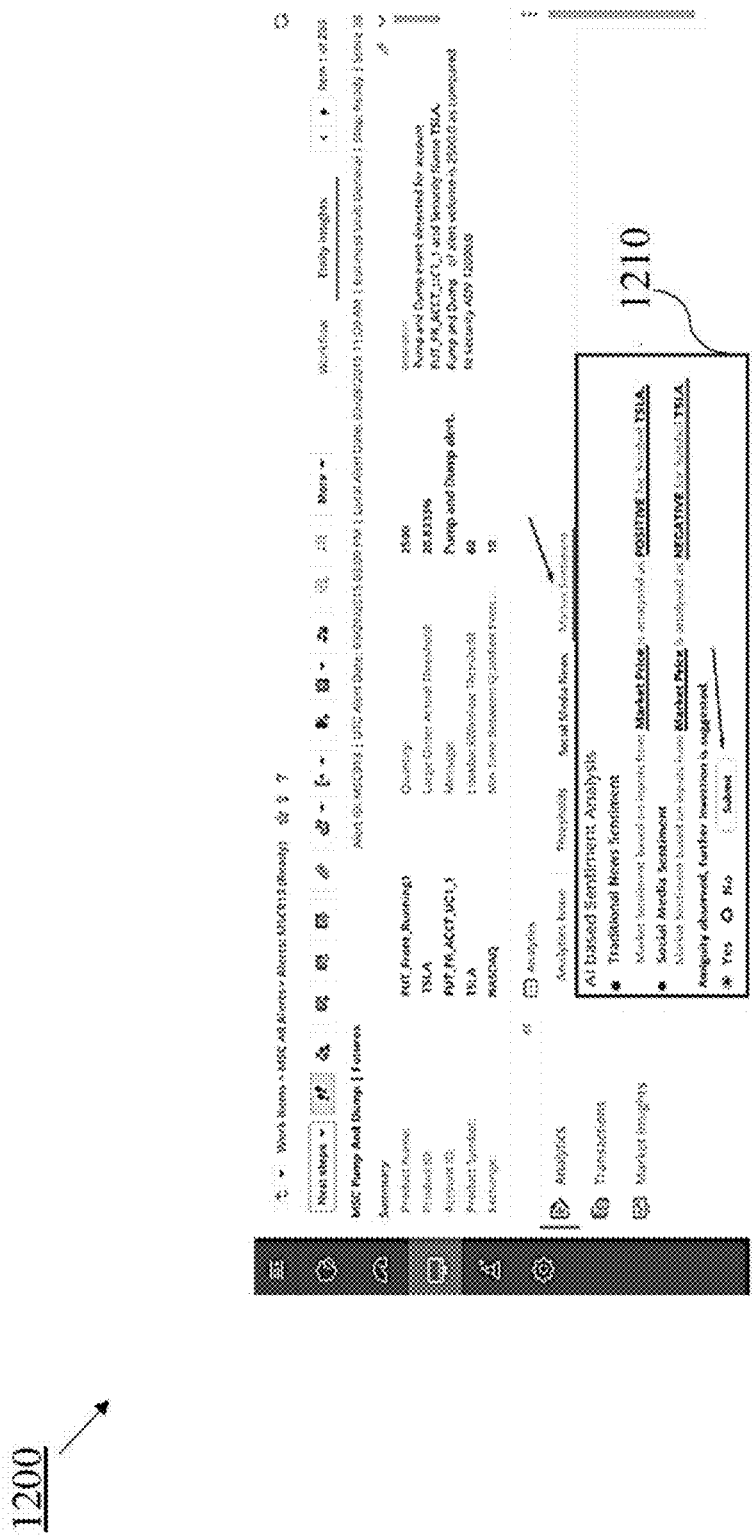
FIG. 12 is an example of a screenshot of User Interface (UI) showing an anomaly based on social media sentiment, in accordance with some embodiments of the present invention.

According to some embodiments of the present disclosure, the convoluted output, e.g., the new-alert may be fed to a UI to be displayed to a user. The UI may be associated to the analytics engine. For example, as shown in FIG. 12.

Figure 7:
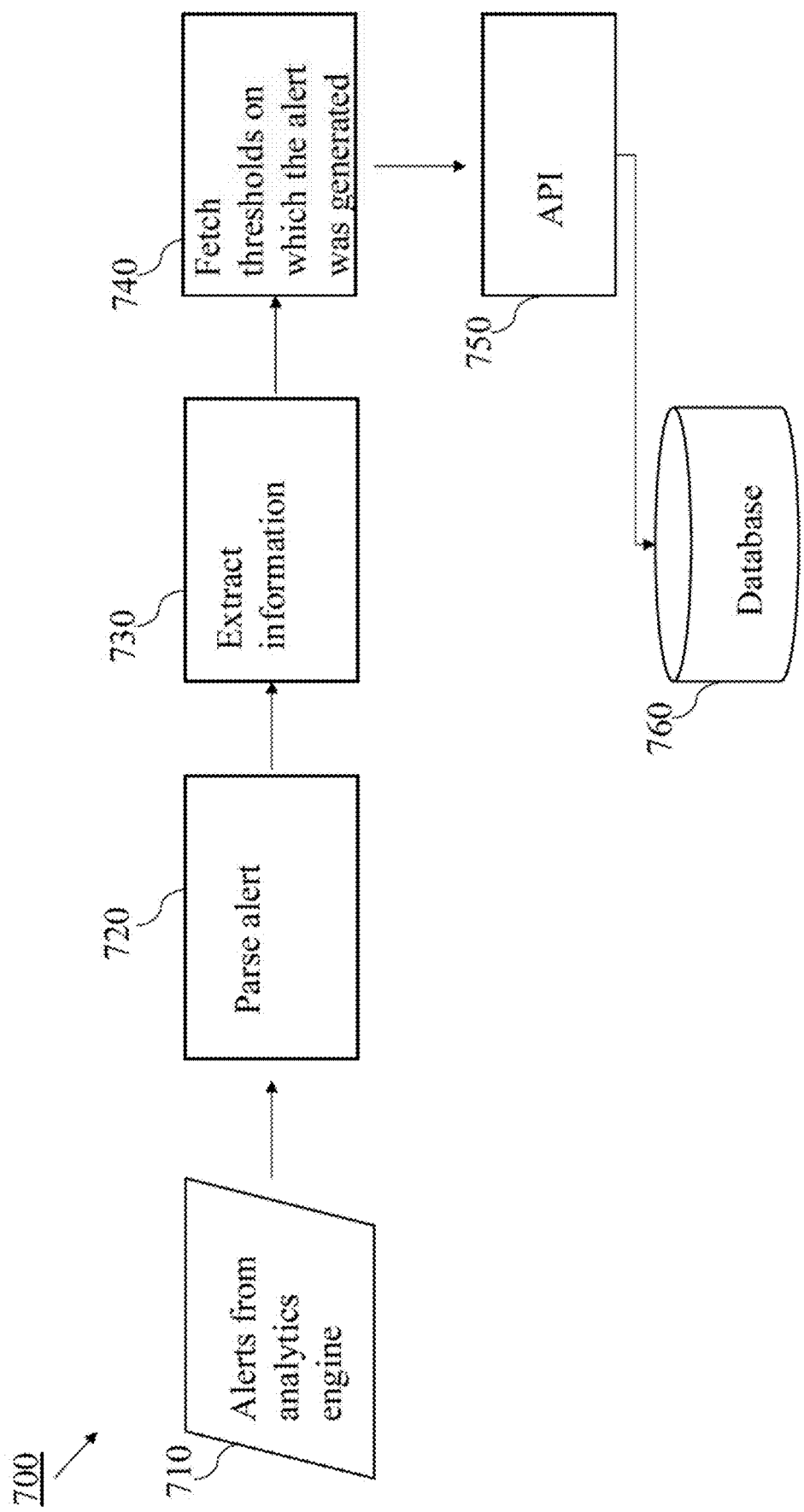
FIG. 7 is a high-level workflow of context extraction module, in accordance with some embodiments of the present invention.

FIG. 7 is a high-level workflow of context extraction module 700, in accordance with some embodiments of the present invention.

According to some embodiments of the present disclosure, alerts from analytics engine 710 may be parsed 720 to extract information 730 such as instrument identifier, e.g., symbol and ISIN information. Fetch thresholds on which the alert was generated 740 by using APIs 750 exposed by an investigation platform used for financial crime investigations. The thresholds may be stored in a database 760 and may be used for decision making.

Figure 8:
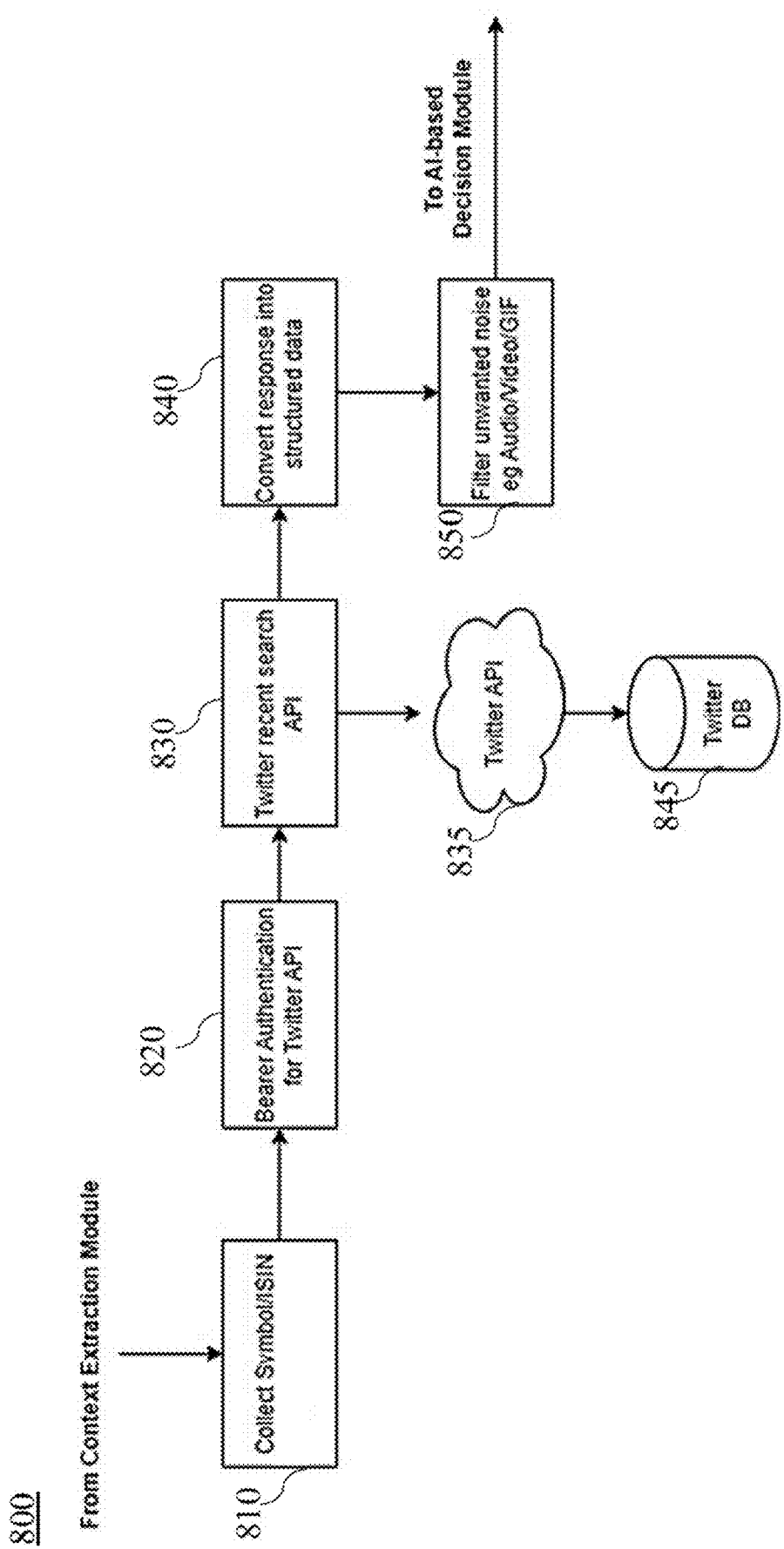
FIG. 8 is a high-level workflow of social media feeds extraction module, in accordance with some embodiments of the present invention.

FIG. 8 is a high-level workflow of social media feeds extraction module 800, in accordance with some embodiments of the present invention.

According to some embodiments of the present disclosure, from a module, such as context extraction module 135 in FIG. 1A, receiving instrument-identifier, e.g., collect symbol and ISIN 810. The instrument-identifier may be used as a request parameter for searching social-media posts, such as tweets. Before Twitter® recent search API 830, by Twitter® API 835 which retrieves from Twitter database 845, operating a bearer authentication for Twitter® API 820.

According to some embodiments of the present disclosure, bearer authentication, also known as token authentication, is a Hypertext Transfer Protocol (HTTP) authentication scheme that involves the use of security tokens called bearer tokens. It allows access to resources based on a cryptic string known as the bearer token.

According to some embodiments of the present disclosure, a list of tweets received from an API may be collected and some post-processing may be operated, such as, convert responses into structured data 840. The post processing may include filter unwanted noise e.g., audio or video or Graphics Interchange Format (GIF) 850 by noise filtering such as audio and video filters and converting the noise into structured data. Twitter® is an example of a social-media platform.

Figure 9:
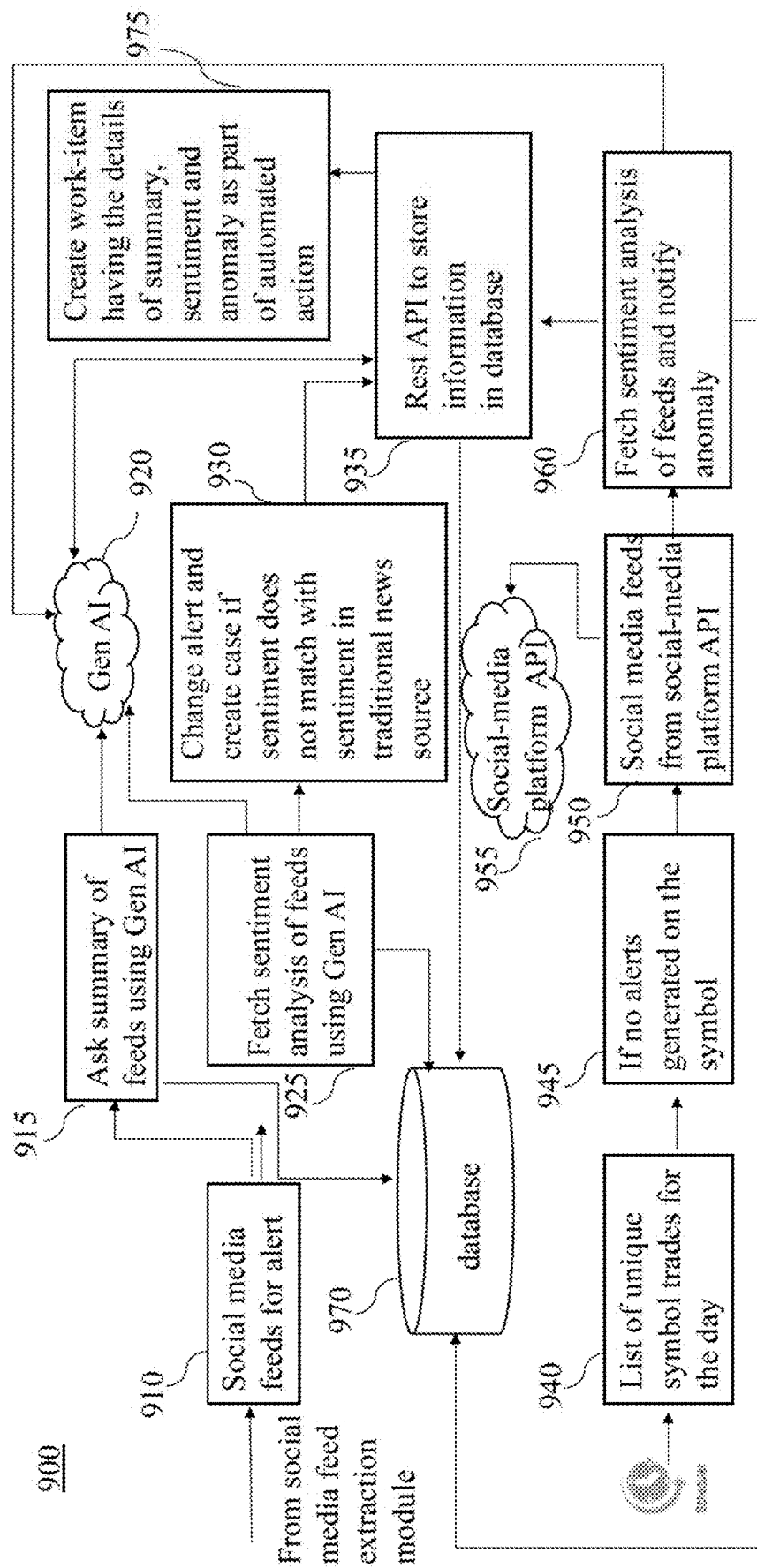
FIG. 9 is a high-level workflow of AI-based decision module, in accordance with some embodiments of the present invention.

FIG. 9 is a high-level workflow 900 of AI-based decision module, in accordance with some embodiments of the present invention.

According to some embodiments of the present disclosure, social media feeds for alert 910 may be received from a module, such as social-media feeds-extraction module 140 in FIG. 1A. Ask summary of feeds using Gen AI 915 may be operated by a system such as system 100A in FIG. 1A.

According to some embodiments of the present disclosure, the generated summary by using Gen AI 920 may be implemented for example, by Open AI libraries with GPT-4 model.

According to some embodiments of the present disclosure, fetch sentiment analysis of feeds using Gen AI 925 may be operated to analyze the overall sentiment of social-media feeds associated with the instrument-identifier, e.g., symbol by using Gen AI 920.

According to some embodiments of the present disclosure, the summary of the social-media feeds and the sentiment of the social-media feeds, may be stored in a database 970, such as social-medial database 165 in FIG. 1A by using API.

According to some embodiments of the present disclosure, change alert and create case if sentiment do not match with sentiment in traditional news source 930 may be operated when the sentiment analysis of feeds by using the Gen AI for the instrument-identifier doesn't match the sentiment that has been analyzed for the instrument-identifier in the alert from traditional source news. For example, RavenPack News Analytics is a powerful service that analyzes news from over 40,000 sources. It evaluates sentiment in news articles and provides relevance of news events to an instrument.

According to some embodiments of the present disclosure, Representational State Transfer (REST) API to store information in database 935 may be used. The information stored in the database 970 may be the change in content of alert and the anomaly that indicates a detected market sentiment manipulation that is related to financial instruments trading. A sentiment mismatch may be for generated alerts where traditional sentiment and social-media sentiment doesn't matched. Anomaly detection is applicable when alerts are not generated but the social-media feeds suggest a possibility of an alert.

According to some embodiments of the present disclosure, a tool that is used for managing unattended background program execution of tasks, such as a scheduler may retrieve a list of unique symbol trades for the day 940, such that for each financial instrument that has been traded in the preconfigured period, e.g., a day, if no alerts generated on the symbol 945, e.g., instrument-identifier, social-media feeds from social-media platform API 950 such as Twitter® may be retrieved.

According to some embodiments of the present disclosure, fetch sentiment analysis feeds and notify anomaly 960 by fetching the sentiment analysis from the database 970 and searching an anomaly between a sentiment from traditional news source and the analyzed social-media sentiment.

According to some embodiments of the present disclosure, create work-item having details of summary, sentiment, and anomaly as part of automated action 975. For example, when sentiment from traditional news source doesn't match with social-media sentiment analyzed in system 100A in FIG. 1A, the ambiguity may be raised by changing the alert step to auto-escalate and creating a case against it.

According to some embodiments of the present disclosure, for example, a false positive alert that should be changed or removed based on an anomaly in the sentiment may be in case tweets from social-media are defined in the time window of 5 days and time window threshold defined in the system is 8 days then an override threshold may be applied on the specific symbol, so that it will not negatively impact tweets from other symbols.

Figure 10:
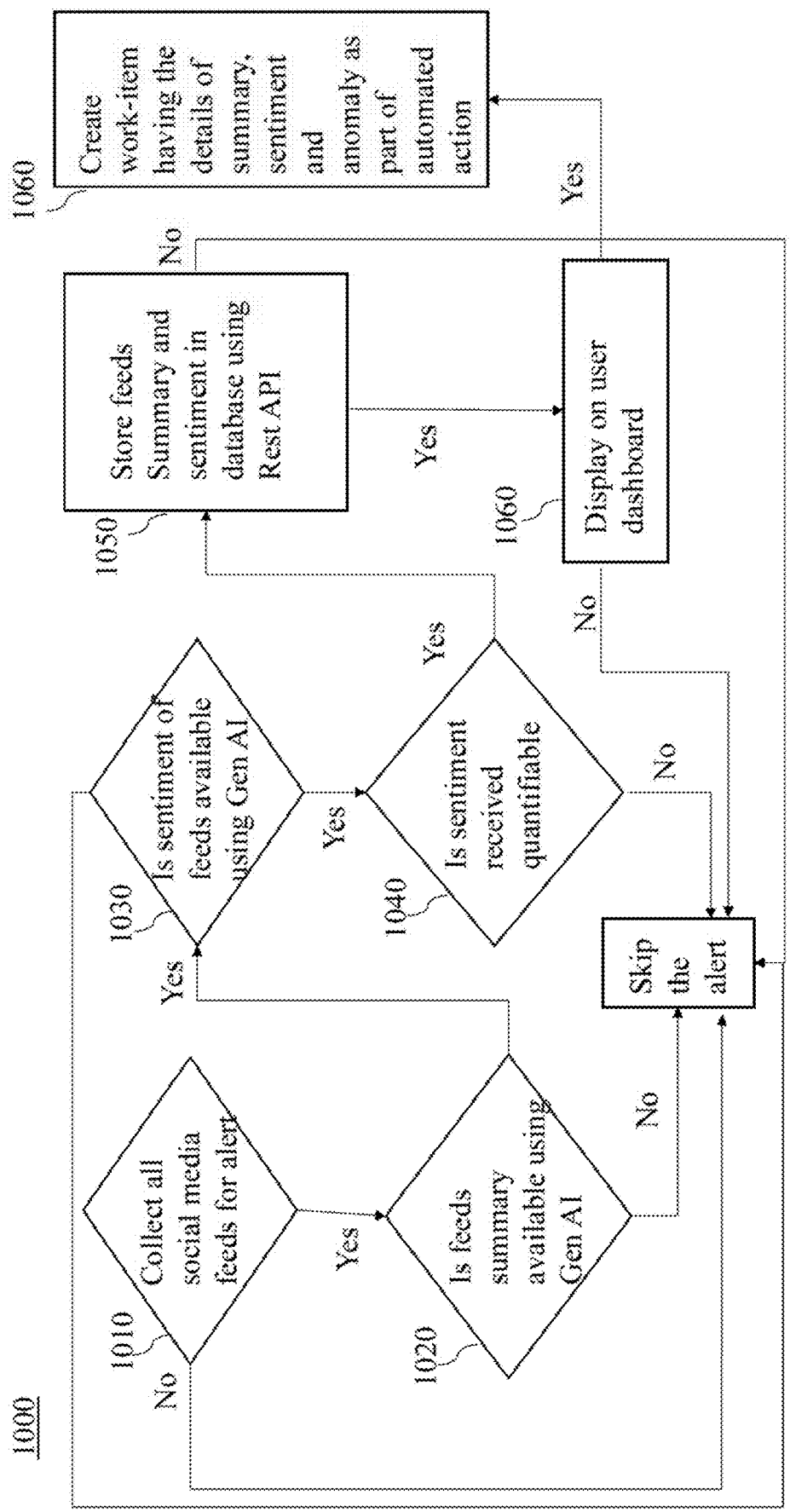
FIG. 10 a high-level workflow of AI-based decision module, in accordance with some embodiments of the present invention.

FIG. 10 a high-level workflow 1000 of AI-based decision module, in accordance with some embodiments of the present invention.

According to some embodiments of the present disclosure, in a system, such as system 100A, the following operations may be performed.

According to some embodiments of the present disclosure, collect all social-media feeds for alert 1010. The alert may relate to suspicious financial-activity and received from an analytics engine, such as analytics engine 115 in FIG. 1A.

According to some embodiments of the present disclosure, checking if feeds summary available by using Gen AI 1020 and then checking if sentiment of feeds is available by using Gen AI 1030.

According to some embodiments of the present disclosure, checking if sentiment received is quantifiable 1040 as Gen AI provides sentiment in terms of rating on the scale of '0' to '10' and storing feeds summary and sentiment in database by using REST API 1050. For example, the database may be database 970 in FIG. 9.

According to some embodiments of the present disclosure, display on user dashboard 1060 and create work-item having the details of summary, sentiment, and anomaly as part of automated action.

Figure 11A:
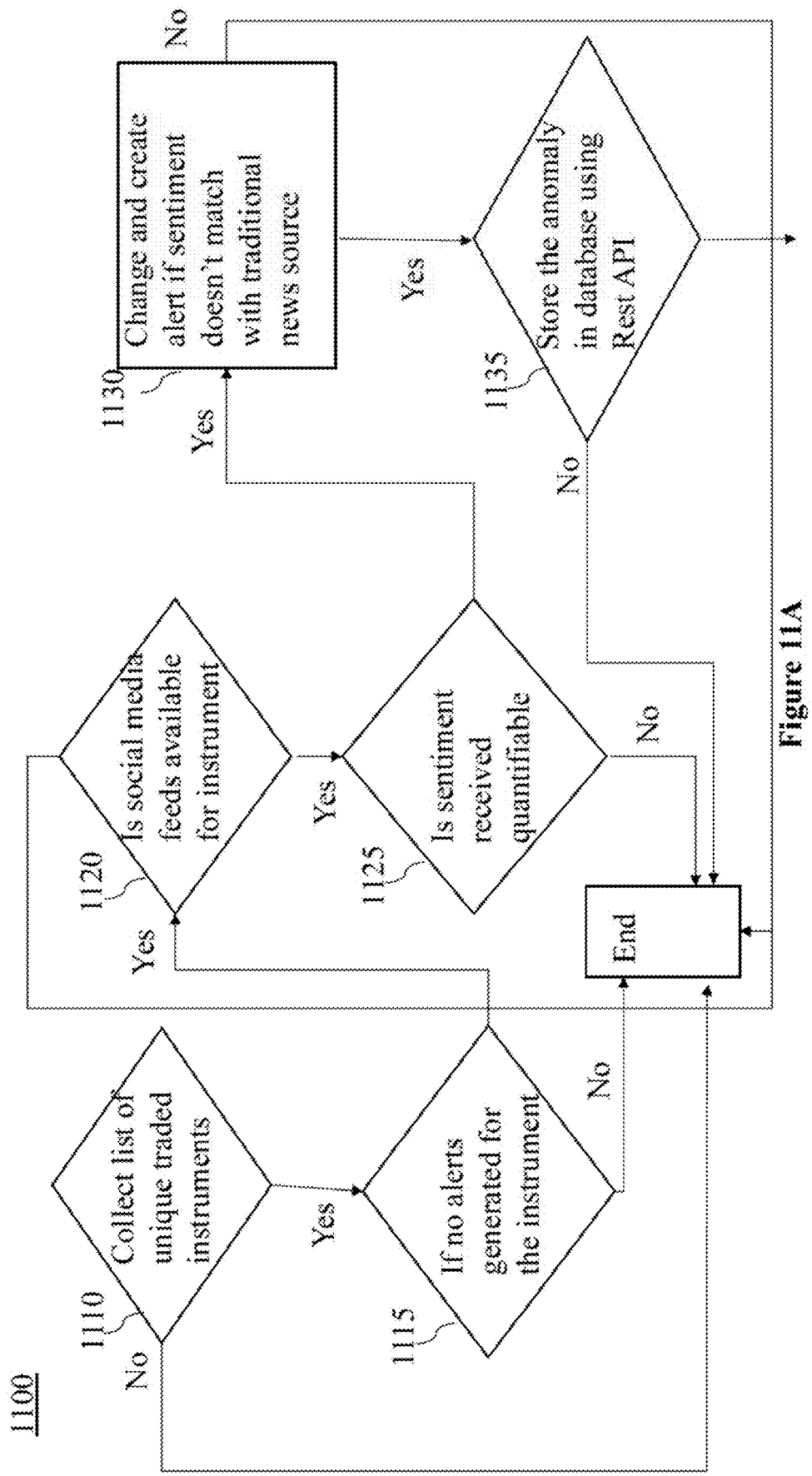
FIGS. 11A-11B are a high-level workflow of AI-based decision module, in accordance with some embodiments of the present invention.
Figure 11B:
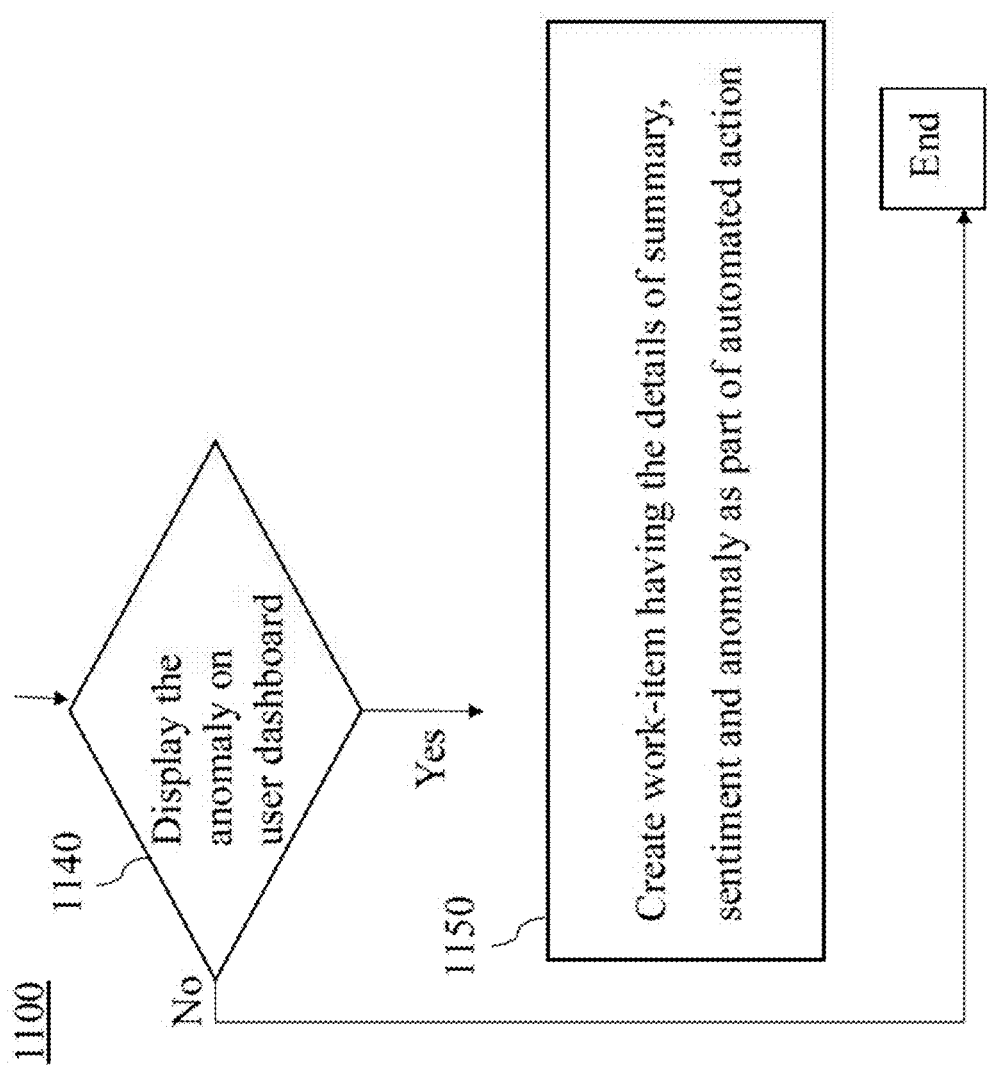

FIGS. 11A-11B are a high-level workflow 1100 of AI-based decision module, in accordance with some embodiments of the present invention.

According to some embodiments of the present disclosure, in a system, such as system 100A, the following operations may be performed.

According to some embodiments of the present disclosure, collect list of unique traded instruments 1110 and if no alerts generated for the instrument 1115 checking if social-media feeds available for instrument 1120.

According to some embodiments of the present disclosure, checking if sentiment received is quantifiable 1125 and change and create alert if sentiment doesn't match the sentiment of traditional news source 1130 for the instrument in the alert.

According to some embodiments of the present disclosure, store the anomaly in database using REST API 1135. For example, the database may be database 970 in FIG. 9.

According to some embodiments of the present disclosure, display the anomaly on user dashboard 1140 and create work-item having the details of summary, sentiment, and anomaly as part of automated action 1150.

FIG. 12 is an example of a screenshot of User Interface (UI) 1200 showing an anomaly based on social media sentiment, in accordance with some embodiments of the present invention.

According to some embodiments of the present disclosure, in a system, such as system 100A, when sentiment from traditional source news doesn't match with sentiment generated from social-media feeds, then the AI based sentiment analysis may be displayed 1210.

Figure 13:
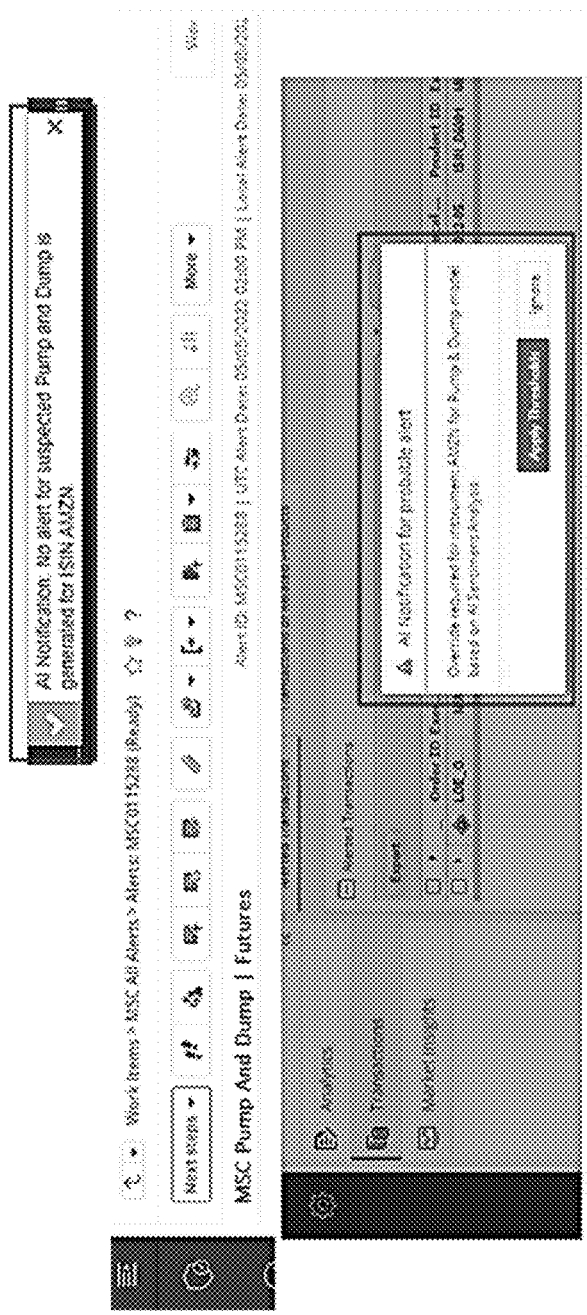
FIG. 13 is an example of a screenshot of UI showing a notification for anomaly based on social media sentiment, in accordance with some embodiments of the present invention.

FIG. 13 is an example of a screenshot of UI 1300 showing a notification for anomaly based on social media sentiment, in accordance with some embodiments of the present invention.

According to some embodiments of the present disclosure, in a system, such as system 100A when there is an alert for pump-and-dump of an instrument coming from the analytics engine, such as analytics engine 115 in FIG. 1A then, based on comparison between the sentiment of traditional source news related to the instrument and the sentiment generated by the Gen AI for social-media feeds related to the instrument it may eliminate the incoming alert, thus reducing false positive alerts.

Figure 14:
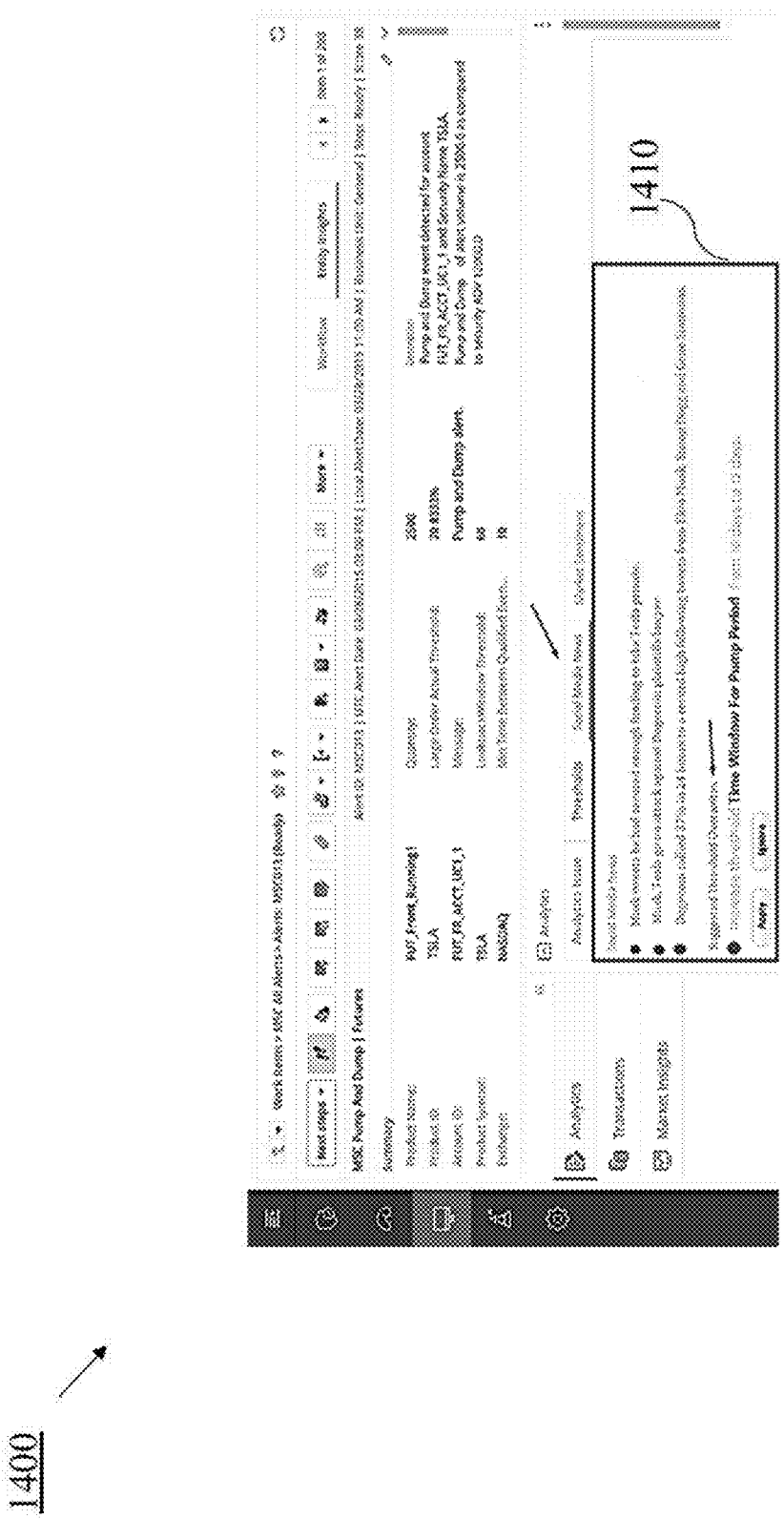
FIG. 14 is an example of a screenshot of UI showing a summary of social media feeds, in accordance with some embodiments of the present invention.

FIG. 14 is an example of a screenshot of UI 1400 showing a summary of social media feeds, in accordance with some embodiments of the present invention.

According to some embodiments of the present disclosure, in a system such as system 100A the summary of the social-media feeds that are related to the instrument in the alert from the analytics engine may be displayed 1410 along with a suggestion to update the threshold that is related to the alert. For example, "increase threshold 'time window for pump period' from 10 days to 12 days. A new threshold may be determined based on the tweets metadata extracted from the social-media feeds. For Example, If tweets are within the time window of 12 days and threshold in the system is for 10 days, then a threshold update may be suggested or automatically updated.

Figure 15:
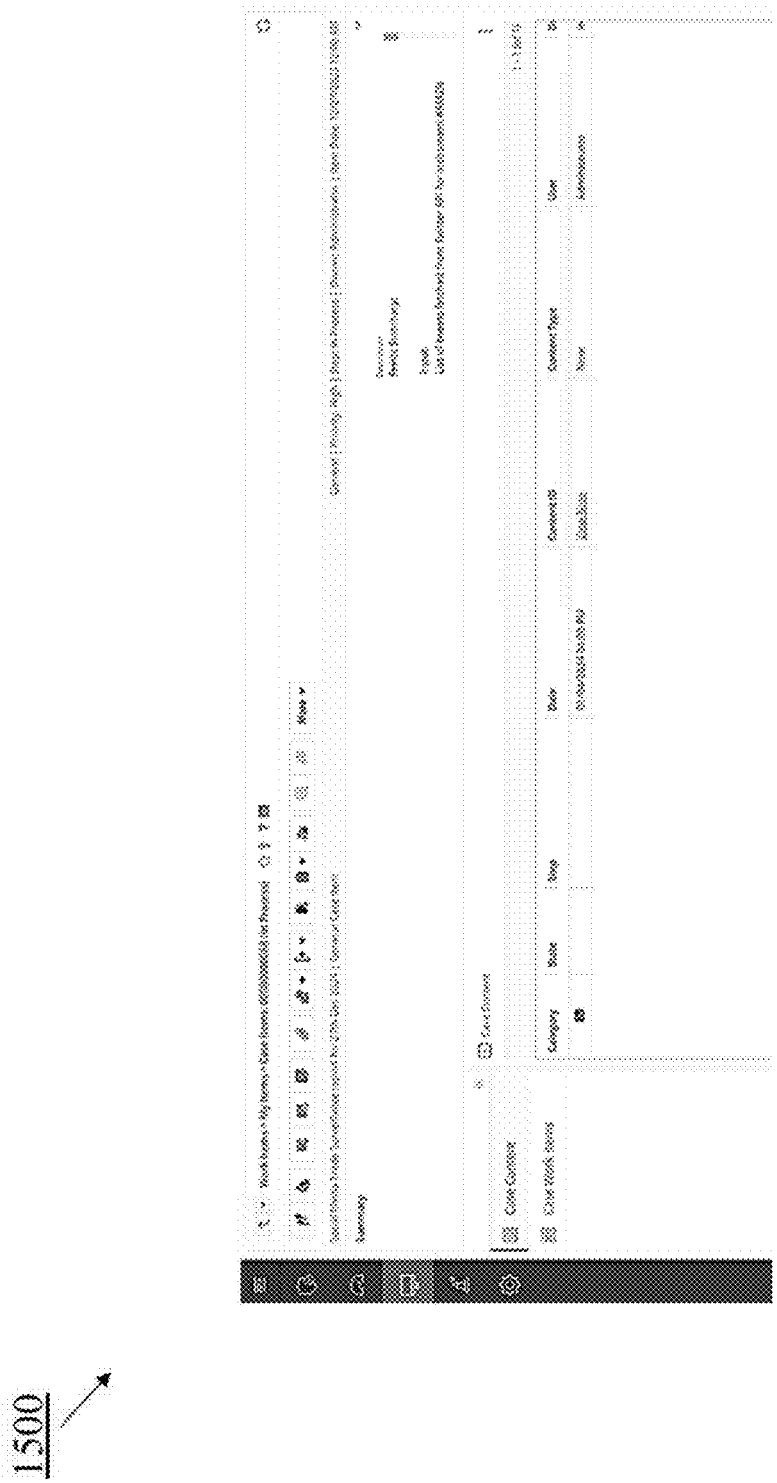
FIG. 15 is an example of a screenshot of UI showing a case item with details of summary, sentiment, and anomaly, in accordance with some embodiments of the present invention.

FIG. 15 is an example of a screenshot of UI 1500 showing a case item with details of summary, sentiment, and anomaly, in accordance with some embodiments of the present invention.

According to some embodiments of the present disclosure, in a system such as system 100A the work-item including the summary of the social-media feeds which are related to the alert form the analytics engine, the sentiment that has been generated by the Gen AI for the social-media feeds and the anomaly between a sentiment from traditional news source and the analyzed social-media sentiment, may be displayed.

According to some embodiments of the present disclosure, the source of the social-media feeds may be displayed as input. For example, list of tweets fetched from Twitter API for instrument AMZN.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for detecting market sentiment manipulation that is related to financial instruments trading, said computer-implemented method comprising:
   (i) monitoring incoming alerts in an analytics engine, during a preconfigured period, wherein said incoming alerts are generated based on one or more predefined alert-generation criteria,
   (ii) retrieving data from each alert in the incoming alerts, by operating a context extraction module, said data comprising: a. an instrument-identifier; and b. information of one or more thresholds of the alert;
   (iii) for each alert in the incoming alerts:
      a. collecting feeds from social-media servers based on the retrieved data by operating a social-media feeds-extraction module;
      b. for each feed in the collected feeds, generating a summary by using Generative Artificial Intelligence (Gen AI); and
      c. analyzing social-media sentiment, by the Gen AI, to be stored in a social-media database with related data of the alert;
   (iv) for each financial instrument that has been traded in the preconfigured period, searching for an anomaly between sentiment from a structured news source and the analyzed social-media sentiment, wherein the anomaly indicates a detected market sentiment manipulation that is related to financial instruments trading;
   (v) storing each anomaly with the instrument-identifier in an anomalies database;
   (vi) pausing each financial transaction of a plurality of financial transactions that has been processed during the preconfigured period and related to the instrument-identifier in the anomalies database;
   (vii) checking each financial instrument that has been traded in the preconfigured period to identify one or more financial instruments that do not have incoming alerts in the analytics engine; and
   (viii) for each financial instrument in the identified one or more financial instruments that do not have incoming alerts in the analytics engine:
      a. collecting feeds from the social-media servers by operating the social-media feeds-extraction module;
      b. for each feed in the collected feeds, generating a summary and analyzing social-media sentiment by operating the Gen AI on the social-media post to be stored in a social-media database with the instrument-identifier corresponding to the alert from which the feed was collected;
      c. retrieving sentiment related to the financial instrument extracted from structured news sources; and
      d. creating a new alert when the analyzed social-media sentiment and the sentiment extracted from the structured news sources of the financial instrument do not match.

2. The computer-implemented method of claim 1, wherein said operating of the context extraction module comprising: for each alert: (i) extracting the instrument-identifier by parsing the alert, wherein said instrument-identifier is at least one of: a. stock-symbol; and b. International Securities Identification Number (ISIN), and (ii) fetching information of the one or more thresholds of the alert of the one or more thresholds by exposing Application Programming Interfaces (API) s of the analytics engine.

3. The computer-implemented method of claim 1, wherein said operating of the social-media feeds-extraction module comprising: (i) using exposed APIs of the social-media servers to collect feeds based on the instrument-identifier; (ii) removing media objects and media elements from the feeds; and (iii) converting each collected feed into structured data.

4. The computer-implemented method of claim 1, wherein said computer-implemented method further comprises when the analyzed social-media sentiment and the sentiment extracted from the structured news sources of the financial instrument do not match, updating the one or more thresholds of the alerts.

5. The computer-implemented method of claim 1, wherein the computer-implemented method further showing each financial transaction that has been paused with financial instrument and instrument-identifier details via a User Interface of the analytics engine for further analysis by a user.

6. The computer-implemented method of claim 1, wherein the new alert is presented via a UI of the analytics engine for further analysis by a user.

7. The computer-implemented method of claim 1, wherein the computer-implemented method further comprises pausing each financial transaction that has been processed during the preconfigured period and related to the financial instrument, when the analyzed social-media sentiment and the sentiment extracted from the structured news sources of the financial instrument do not match.

8. The computer-implemented method of claim 1, wherein the sentiment from the structured news source is retrieved from a structured news source database.

9. A computerized-system for detecting market sentiment manipulation that is related to financial instruments trading, said computerized-system comprising:
one or more processors, said one or more processors are configured to:
(i) monitor incoming alerts in an analytics engine, during a preconfigured period, wherein said incoming alerts are generated based on one or more predefined alert-generation criteria,
(ii) retrieve data from each alert in the incoming alerts, by operating a context extraction module, said data comprising: a. an instrument-identifier; and b. information of one or more thresholds of the alert;
(iii) for each alert in the incoming alerts:
 a. collect feeds from social-media servers based on the retrieved data by operating a social-media feeds-extraction module;
 b. for each feed in the collected feeds, generate a summary by using Generative Artificial Intelligence (Gen AI); and
 c. analyzing social-media sentiment by providing the generated summary of each feed to the Gen AI to be stored in a social-media database with related data of the alert;
(iv) for each financial instrument that has been traded in the preconfigured period, searching for an anomaly between sentiment from a structured news source and the analyzed social-media sentiment, wherein the anomaly indicates a detected market sentiment manipulation that is related to financial instruments trading;
(v) store each anomaly with the instrument-identifier in an anomalies database;
(vi) pause each financial transaction of a plurality of financial transactions that has been processed during the preconfigured period and related to the instrument-identifier in the anomalies database;
(vii) check each financial instrument that has been traded in the preconfigured period to identify one or more financial instruments that do not have incoming alerts in the analytics engine; and
(viii) for each financial instrument in the identified one or more financial instruments that do not have incoming alerts in the analytics engine:
 a. collecting feeds from the social-media servers by operating the social-media feeds-extraction module;
 b. for each feed in the collected feeds, generating a summary and analyzing social-media sentiment by operating the Gen AI on the social-media post to be stored in a social-media database with the instrument-identifier corresponding to the alert from which the feed was collected;
 c. retrieving a sentiment related to the financial instrument extracted from structured news sources; and
 d. creating a new alert when the analyzed social-media sentiment and the sentiment extracted from the structured news sources of the financial instrument do not match.

* * * * *